(12) United States Patent
Nishibata et al.

(10) Patent No.: US 7,680,138 B2
(45) Date of Patent: Mar. 16, 2010

(54) INTER-MODULE COMMUNICATION APPARATUS

(75) Inventors: Motohide Nishibata, Wakayama (JP); Kunihiko Hayashi, Osaka (JP); Yuki Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 11/185,829

(22) Filed: Jul. 21, 2005

(65) Prior Publication Data

US 2006/0018331 A1     Jan. 26, 2006

(30) Foreign Application Priority Data

Jul. 26, 2004    (JP)   ........................... P2004-217456

(51) Int. Cl.
    *H04L 12/56*      (2006.01)
(52) U.S. Cl. .................. 370/412; 370/389; 370/392; 370/400
(58) Field of Classification Search ................ 370/389, 370/392, 400, 412, 413, 403; 710/100
See application file for complete search history.

(56) References Cited

U.S. PATENT DOCUMENTS

| | | | | |
|---|---|---|---|---|
| 5,467,346 A | * | 11/1995 | Ito et al. ..................... | 370/403 |
| 5,566,170 A | * | 10/1996 | Bakke et al. ................ | 370/392 |
| 6,792,488 B2 | * | 9/2004 | Wolrich et al. .............. | 710/100 |
| 7,200,168 B1 | * | 4/2007 | Fisher et al. ................ | 375/222 |
| 2002/0087708 A1 | | 7/2002 | Low et al. | |
| 2002/0136205 A1 | | 9/2002 | Sasaki | |
| 2004/0015948 A1 | | 1/2004 | Sueyoshi | |

FOREIGN PATENT DOCUMENTS

JP            5-334104 A      12/1993

* cited by examiner

*Primary Examiner*—Dang T Ton
*Assistant Examiner*—Pamit Kaur
(74) *Attorney, Agent, or Firm*—McDermott Will & Emery LLP

(57) ABSTRACT

The inter-module communication apparatus includes a first module and a second module which operate individually on a processor; a common memory interposed between the first module and the second module for functioning as a communication medium; a plurality of communication paths provided to the common memory for connecting the first module and the second module to be communicable; a transmission unit for transmitting communication data from the first module to the second module; a reception unit for receiving the communication data transmitted from the first module by the second module; a processing order relating device for registering a processing order of communication processing, which is set between each communication path constituting a plurality of the communication paths; and a processing order relevance register which, for transmission, registers the processing order to the processing order relating device when the processing order is set for the communication data to be transmitted.

12 Claims, 18 Drawing Sheets

FIG. 12
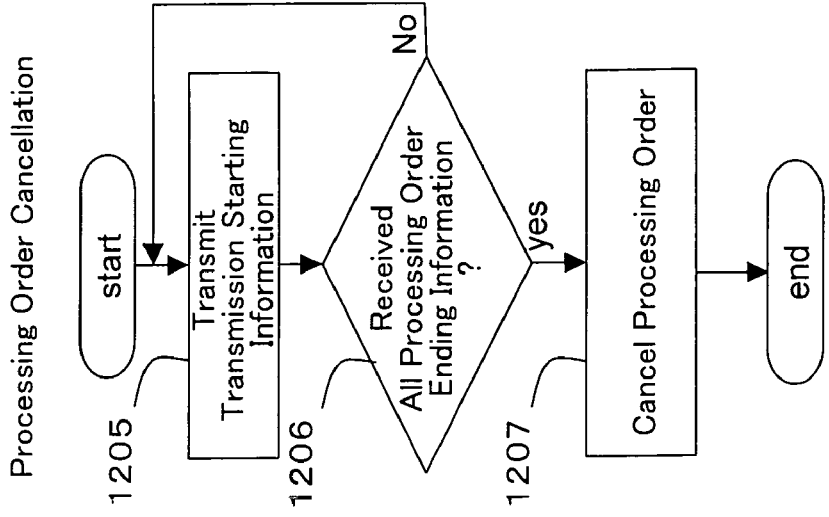
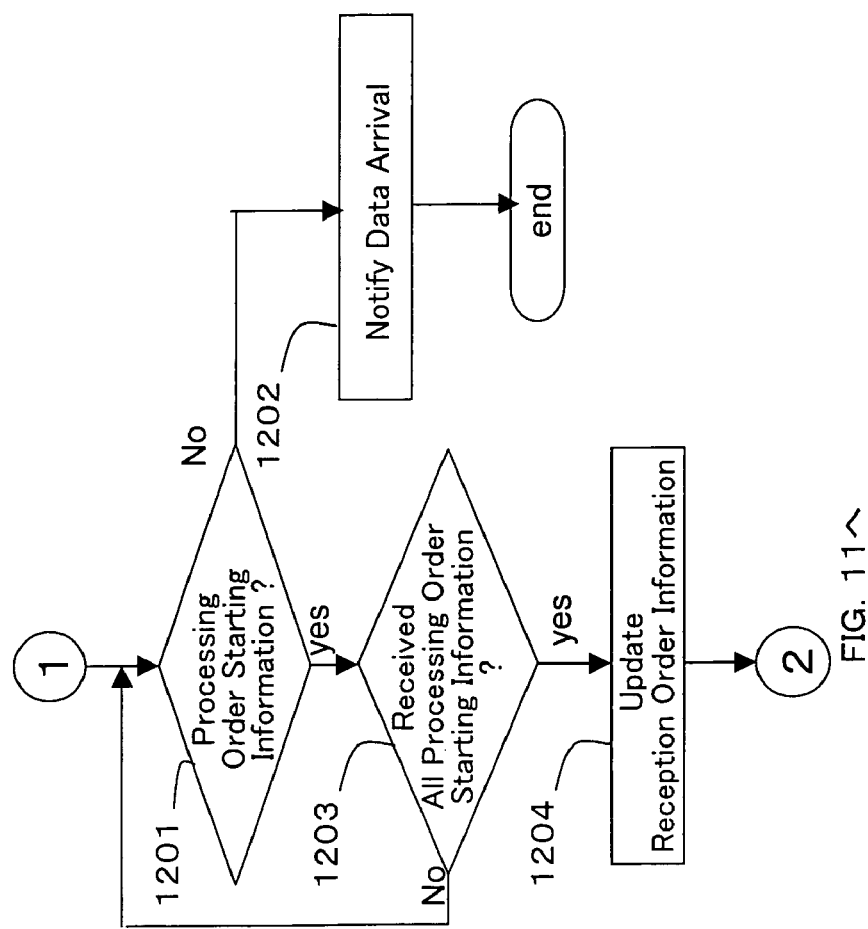

INTER-MODULE COMMUNICATION APPARATUS

BACKGROUND OF THE INVENTION

1. Field of the Invention

The present invention relates to an apparatus and a method for controlling communication between modules which operates on processors such as a plurality of microcomputers, microprocessors, DSPs, etc.

2. Description of the Related Art

Conventionally, data is transmitted and received between processors in the manner as described below. That is, a transmission side gives numbers to transmission packets. A reception side unifies data obtaining area and determines data to be processed according to numbering information given by the transmission side at the time of receiving the data. With this, transmission and reception of data to be processed can be surely performed in order. For example, Japanese Patent Unexamined Publication No. 5-334104 discloses such technique.

Recently, it has become common to mount a plurality of processor devices and semiconductor devices such as system-on-chips on a video/audio recording apparatus and a video/audio reproducing apparatus. In these apparatuses, it is necessary to process input video/audio data within a specific limited processing time.

Let's look into a case with the conventional configuration where, for example, for communicating video data and audio data which are to be processed through a plurality of tasks (processes), the data is received after transmission of given preceding data in a vast amount. In this case, however, processing order of each processing including the processing of the preceding data is assured. Thus, reception processing and the signal processing to be performed thereafter for the following data, which is transmitted after the preceding data, are executed on the reception side after the preceding data (a vast amount of data) is received and the signal processing is carried out thereafter. In that case, it is highly possible that the time required for the entire processing exceeds an allowable processing time (above-described limited specific processing time) set in advance. For this, it is not possible to establish a system in which it is necessary to complete the processing within a specific processing time.

Further, let's look into the processing for stopping reproduction in the middle of performing audio reproduction. In that case, even if a command for stopping reproduction is transmitted under a state where the audio data is transmitted by a large amount right before, the command stopping reproduction is not processed immediately so that a response performance is bad.

In order to overcome the aforementioned shortcomings, as shown in FIG. 19, there may be a structure which separates the communication processing in accordance with the properties (data or command) of the communication processing target.

In this case, there is no dependency between each communication path and data is processed if there is any data arrived in a reception unit. Further, the order of priority is set in each communication path in advance so that the data can be processed in order according to the priority order of each communication path. With such configuration, it is possible to quickly execute the functions of reproduction, recording, stop, etc. even if the video/audio data is being transmitted by a large amount. Thus, the response performance can be improved. Furthermore, even if a plurality of data are transmitted and one of the data carries a large data amount, the data other than the data of a large transmission amount can also be received by a specific interval. Therefore, it is less likely to exceed the above-described specific processing time. Further, since each communication path is divided into a plurality of paths, it is not necessary to analyze the received data one by one for checking what the data is about. Thus, it enables to perform the processing at still higher speed.

However, each communication path is independent in the configuration where each path is divided into a plurality of paths, so that there is no assurance in the state of association between processing order of reproduction, recording, stop commands on the reception side and the data transmission order. Thus, there may cause following shortcomings.

For example, in a case where the video is rewound by three frames from the present position and the reproduction processing is performed from that data position, the transmission side, after transmitting the data to be reproduced, transmits a command for three-frame reproduction. However, there may be a case where the reception side receives the command for three-frame reproduction prior to receiving the data to be reproduced. In that case, the command is executed before receiving the video data.

Furthermore, in a case of transmitting moving-picture data and still-picture data simultaneously, the processing in the communication paths is almost uniformly performed. Thus, even if a user desires to give priority to the processing of the moving-picture data, such priority processing cannot be performed.

SUMMARY OF THE INVENTION

Therefore, the main object of the present invention is to provide, in inter-module communication used on a video/audio recording/reproducing system, an inter-module communication function which is capable of setting the priority processing order of data and command, and setting the processing priority between the communication paths while keeping high-speed data processing function with an excellent response performance.

In order to overcome the aforementioned problems, the inter-module communication apparatus of the present invention is formed as an inter-module communication apparatus wherein communication is achieved through a common memory between a first module and a second module which operate individually on the same or different processors. The inter-module communication apparatus is constituted as follows.

That is, the inter-module communication apparatus of the present invention comprises: a plurality of communication paths provided to the common memory for connecting the first module and the second module to be communicable; a transmission unit for transmitting communication data from the first module by the second module; a reception unit for receiving the communication data transmitted from the first module to the second module; a processing order relating device for registering a processing order of communication processing, which is set between each communication path constituting a plurality of the communication paths; a processing order relevance register which; for transmission, registers the processing order to the processing order relating device when the processing order is set for the communication data to be transmitted; a reception processing relevance checking device which, for reception, checks with the processing order relating device whether or not there is the processing order set between the communication path which transmitted the received communication data and other communication paths; and a processing order information analyzer which, for reception, analyzes whether or not the received communication data is in compliance with the processing order, when the reception processing relevance checking device confirms that there is the processing order set between the communication path which transmitted the received communication data and other communication paths. The communication data which is judged by the processing order information analyzer as being compliant with the processing order is reception-processed according to the processing order.

In the case of this inter-module communication apparatus, data is processed according to the processing order only when the processing order is required for the data to be transmitted between the communication paths. When the processing order is not necessary, data is transmitted and received through each in communication path at a high speed.

It is preferable that the transmission unit comprise the processing order relevance register, the transmission processing relevance checking device, the processing order information managing device, and the processing order information adder, and that the reception unit comprise the reception processing relevance checking device and the processing order information analyzer. Thereby, it is possible to synchronize the data transmission which requires the processing order between the communication paths. Specifically, it is possible to perform processing complying with the processing order only when the processing order is required between the communication paths. When the processing order is not necessary, the conventional processing is performed thus keeping the compatibility.

The present invention is formed as follows by improving a part of the above-described basic structure. That is, this inter-module communication apparatus further comprises a data position detector which, for transmission, detects positional information of the communication data to be transmitted; a processing order managing device for registering the positional information of the communication data; a data position register which registers respective positional information of the communication data, which is detected by the data position detector, to the processing order managing device in accordance with time sequence.

The processing order information analyzer analyzes whether or not the received communication data is in compliance with the processing order by collating position of the received communication data with registered content of the position register, when the reception processing relevance checking device confirms that there is the processing order set between the communication path which transmitted the received communication data and other communication paths.

This configuration has the following new merits. That is, when transmitting the data having the dependent relation between the communication paths, it is possible to perform transmission/reception of the data, without synchronizing with the processing order
without adding additional new information to the communication data to be transmitted Further, by providing the data position detector, the data position register, and the processing order managing information analyzer, it becomes possible to transmit/receive the communication data having the processing order without increasing the data amount flown in the communication path.

The present invention is formed as follows by improving a part of the above-described basic structure. That is, this inter-module communication apparatus further comprises a communication path switching information transmitter which, for transmission, adds communication path switching information indicating a change of a next transmission communication path to the currently transmitted communication data, when confirmed by collating the processing order with the processing order relating device that the communication path for transmitting the communication data to be processed next is switched from the communication path which is currently in use; a valid communication path information managing device which, for reception, stores valid communication path information designating the communication path as a processing target; a valid communication path information changing device which, for reception, updates the valid communication path information stored in the valid communication path managing device based on the communication switching information which is added to the received communication data; and a processing communication path determining device which, for reception, determines the communication path as a processing target based on the valid communication path information stored in the valid communication path information managing device.

With this configuration, when transmitting the communication data which requires the processing order, the communication path as the processing target is determined uniquely. Thus, it enables to perform transmission/reception of the data having the processing order only by monitoring the data which is transmitted through the communication path as the processing target.

Furthermore, when obtaining the data transmitting through the communication path with the processing order, the communication path through which the data is received is determined uniquely. Thus, the data can be received without judging the communication path to be used for reception. Therefore, it is possible to receive data at still higher speed.

Moreover, the processing order relevance register has the following configuration, comprising:

a processing order starting information transmitter for transmitting processing order starting information which indicates a point where the processing order registered to the processing order relevance register becomes valid a processing order ending information transmitter for transmitting processing order ending information which indicates a point where the processing order registered to the processing order relevance register becomes invalid Thus, it is possible to clearly discriminate the communication data which requires the processing order and the communication data which does not require the processing order. With this, it enables to specify the communication path for transmitting the communication data in the first place when it becomes necessary to clarify the processing order, and the processing for establishing the processing order between the communication paths is selectively performed where necessary.

The present invention is formed as follows by improving a part of the above-described basic structure. That is, in this inter-module communication apparatus, a plurality of the first modules are provided. The transmission unit comprises a first transmitter for transmitting the communication data from one of the first module to the second module, and a second transmitter for transmitting the communication data from the other first module to the second module. The processing order relating device is for recording priority order of communication processing, which are set for the communication path connecting between the first transmission unit and the reception unit and for the communication path connecting between the second transmission unit and the reception unit. The processing order relevance register registers the priority order to the processing order relating device. The reception processing relevance checking device checks with the processing order relating device whether or not the priority order is set. The processing order information analyzer analyzes the communication path to be processed based on the priority order which is checked by the processing order information checking device.

With this configuration, the communication data is processed according to the priority order only when the priority order (corresponds to the above-described processing order) is required for the data to be transmitted between the communication paths. When the priority order is not required, it is possible to transmit/receive the communication data in each communication path at a high speed by the individual communication path. Furthermore, the processing amount transmitted between the communication paths can be suppressed. The priority order herein means the distribution ratio (ratio of processing) at the time of distributing the entire processing amount of a specific period to each communication path.

It is preferable that the processing order relevance register be a device for registering, to the processing order relating device, processing ratio which is allotted to processing of the communication data transmitted through the communication path connecting between the first transmission unit and the reception unit and allotted to processing of the communication data transmitted through the communication path connecting between the second transmission unit and the reception unit, as the priority order.

Further, it is preferable that the processing order relating device further register valid/invalid managing information which indicates validity/invalidity of registered priority information, and processing load amount information which is a threshold value for changing the valid/invalid managing information; and the inter-module communication apparatus further comprises a processing load monitor which sets the processing load amount information according to respective communication amount of the communication path and registers the processing load amount information to the processing order relating device, and a processing load monitoring register which sets the valid/invalid managing information based on a result of comparison between the respective communication amount of the communication path and the processing load amount information.

With this, it is possible to control the reception processing amount to be the optimum in accordance with the transmission data amount in the communication path. Further, it enables to set the ratio of the processing between the communication paths. Moreover, the priority order can be changed in accordance with the processing load amount.

In inter-module communication according to the present invention, it enables to achieve the inter-module communication function by corresponding to the case where there require processing orders for the data and command or corresponding to the processing which requires the priorities between the communication paths, while maintaining the high-speed data processing function with an excellent response performance.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

FIG. 12 is a flowchart for showing the control of the inter-module communication apparatus according to the third embodiment;

DETAILED DESCRIPTION OF THE INVENTION

In the followings, preferred embodiments of the present invention will be described by referring to the accompanying drawings.

FIRST EMBODIMENT

Figure 1:
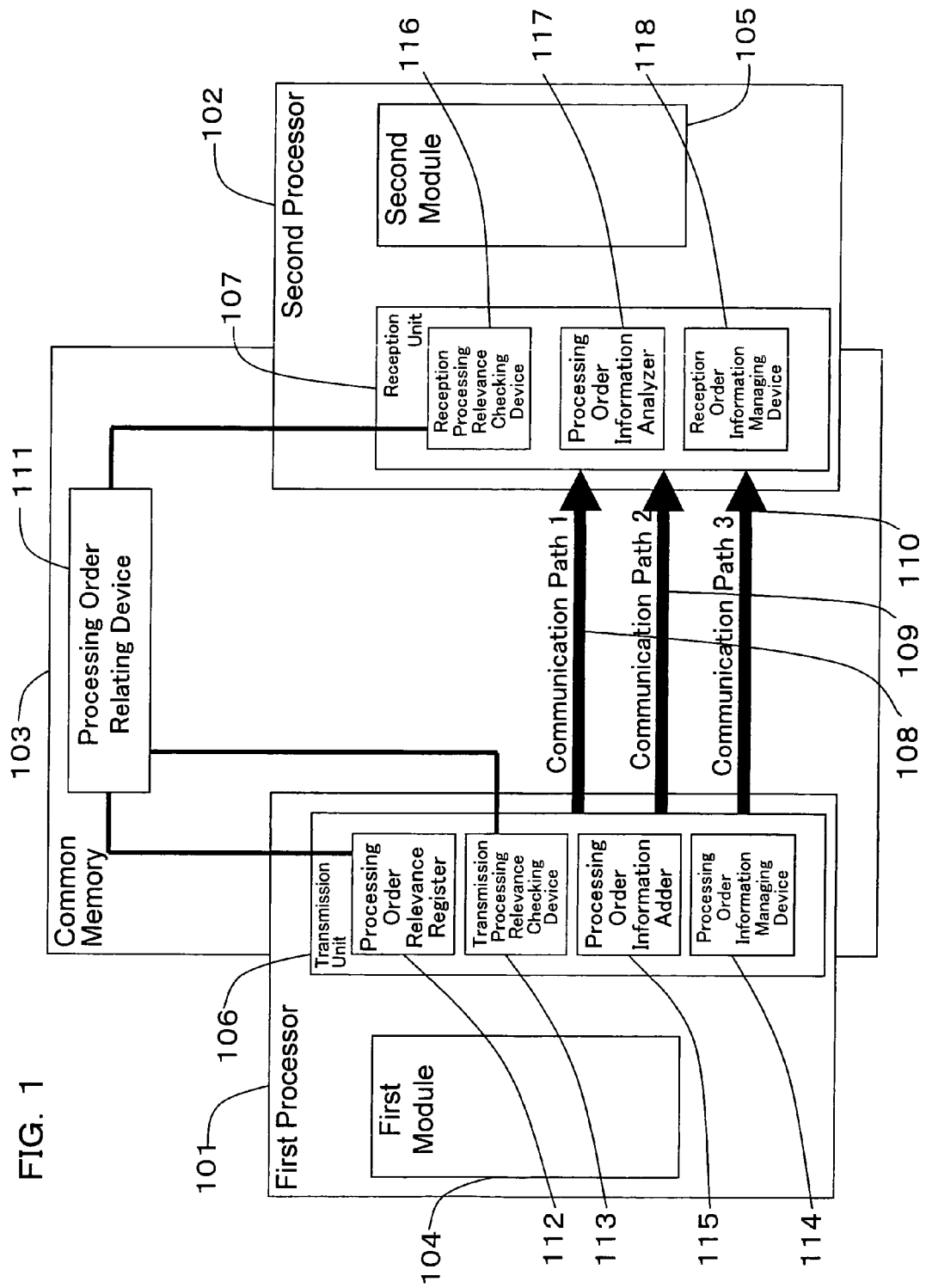
FIG. 1 is a block diagram of an inter-module communication apparatus according to a first embodiment of the present invention.

FIG. 1 shows the structure of an inter-module communication apparatus according to a first embodiment of the present invention. In FIG. 1, the apparatus for performing inter-module communication comprises a first processor 101, a second processor 102, and a common memory 103. A first module 104 operates on the first processor 101. The first module 104 is an example of modules for transmitting data. A second module 105 operates on the second processor 102.

The second module 105 is an example of modules for receiving communication data from the first module 104.

A transmission unit 106 is mounted on the first processor 101. The transmission unit 106 transmits data from the first module 104 to the second module 105. A reception unit 107 is mounted on the second processor 102. The reception unit 107 receives the communication data from the first module 104 in the second module 105.

Reference numerals 108, 109, and 110 are communication paths provided to the common memory 103. These communication paths 108, 109, and 110 are connected to the transmission unit 106 and the reception unit 107 so as to function as communication media for transmitting data form the transmission unit 106 to the reception unit 107.

Reference numeral 111 is a processing order relating device. The processing order relating device 111 registers processing order when there is the processing order in the data to be transmitted through the communication paths 108, 109, and 110. The processing order relating device 111 is set in the common memory 103. The processing order herein means that there is a relation (former processing/latter processing) with the priority in terms of time given to the signal processing of the received communication data when receiving a plurality of communication data which is relative to each other and almost simultaneously communicated.

The transmission unit 106 comprises a processing order relevance register 112, a transmission processing relevance checking device 113, a processing order information managing device 114, and a processing order information adder 115.

The processing order relevance register 112 recognizes the communication path which has the processing order for the communication processing between the communication data to be transmitted. Then, the processing order relevance register 112 registers the processing order of the communication data to the processing order relating device 111.

The transmission processing relevance checking device 113 checks the processing order of the communication path registered to the processing order relating device 111. The processing order information managing device 114 reads out the processing order registered to the processing order relating device 111 and stores it as the processing order (transmission). Also, the processing order information managing device 114 updates the contents of the stored processing order (transmission) every time the communication data is transmitted.

The processing order information adder 115 obtains the processing order information (transmission) from the processing order managing device 114 and adds it to the communication data to be transmitted.

The reception unit 107 comprises a reception processing relevance checking device 116, a processing order information analyzer 117, and a reception order information managing device 118.

The reception processing relevance checking device 116 obtains the registered information (processing order) of the communication paths from the processing order relating device 111. The processing order information analyzer 117 analyzes the processing order (transmission) added to the received communication data. Further, the processing order information analyzer 117 analyzes the communication data to be communication-processed next between the communication paths which are registered to the registered information (processing order) of the communication paths obtained by the reception processing relevance checking device 116. The reception order information managing device 118 manages the reception order. That is, the reception order information managing device 118 reads out the processing order registered to the processing order relating device 111 and stores it as the processing order (reception). Also, the reception order information managing device 118 updates the contents of the stored processing order (reception) every time the communication data is received.

Figure 2:
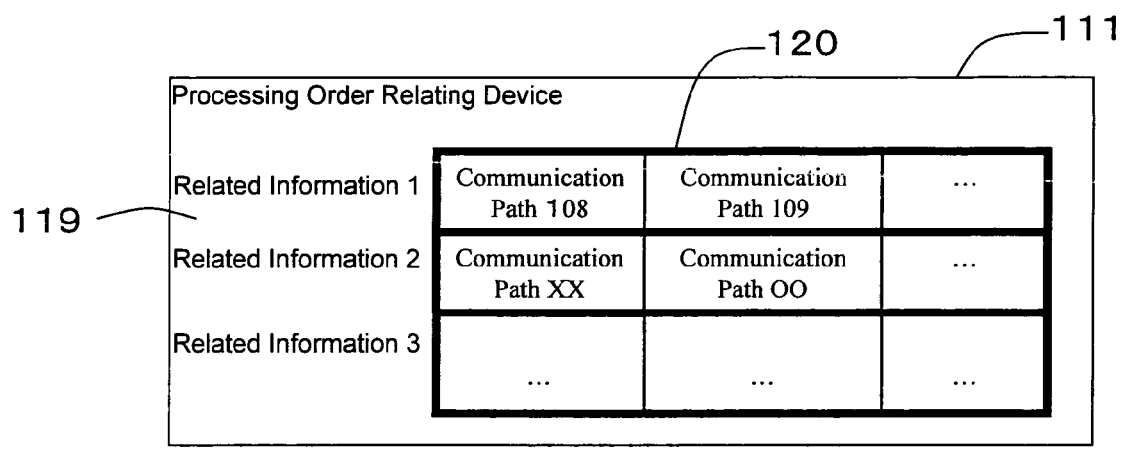
FIG. 2 is a block diagram of a processing order relating device according to the first embodiment.

FIG. 2 shows an example of the processing order information set in the processing order relating device 111 of this embodiment. In FIG. 2, reference numeral 119 is the processing order information, and the processing order information 119 is disclosed to the first and second processors 101, 102. One or a plurality of sets of the processing order information 119 is provided in accordance with the number of processing orders to be set. 120 is the registered content to be stored in each processing order information 119. The registered content 120, specifically, contains the information for specifying the communication paths having the processing order set with respect to each other, which is stored in each of the registered content 120. In the processing order information 119 of FIG. 2, the processing order is set between the communication path 108 and the communication path 109.

Figure 3:
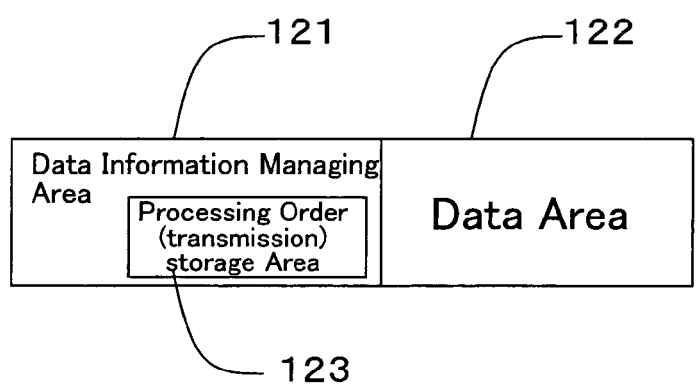
FIG. 3 is a block diagram of the structure of communication data according to the first embodiment.

FIG. 3 shows an example of data format of the communication data which is transmitted from the transmission unit 106 to the communication path 108, the communication path 109, and the communication path 110 and received by the reception unit 107. In the case of FIG. 3, the communication data includes a data information managing area 121 and a data area 122. The data information managing area 121 is provided with a processing order (transmission) storage area 123.

Figure 4:
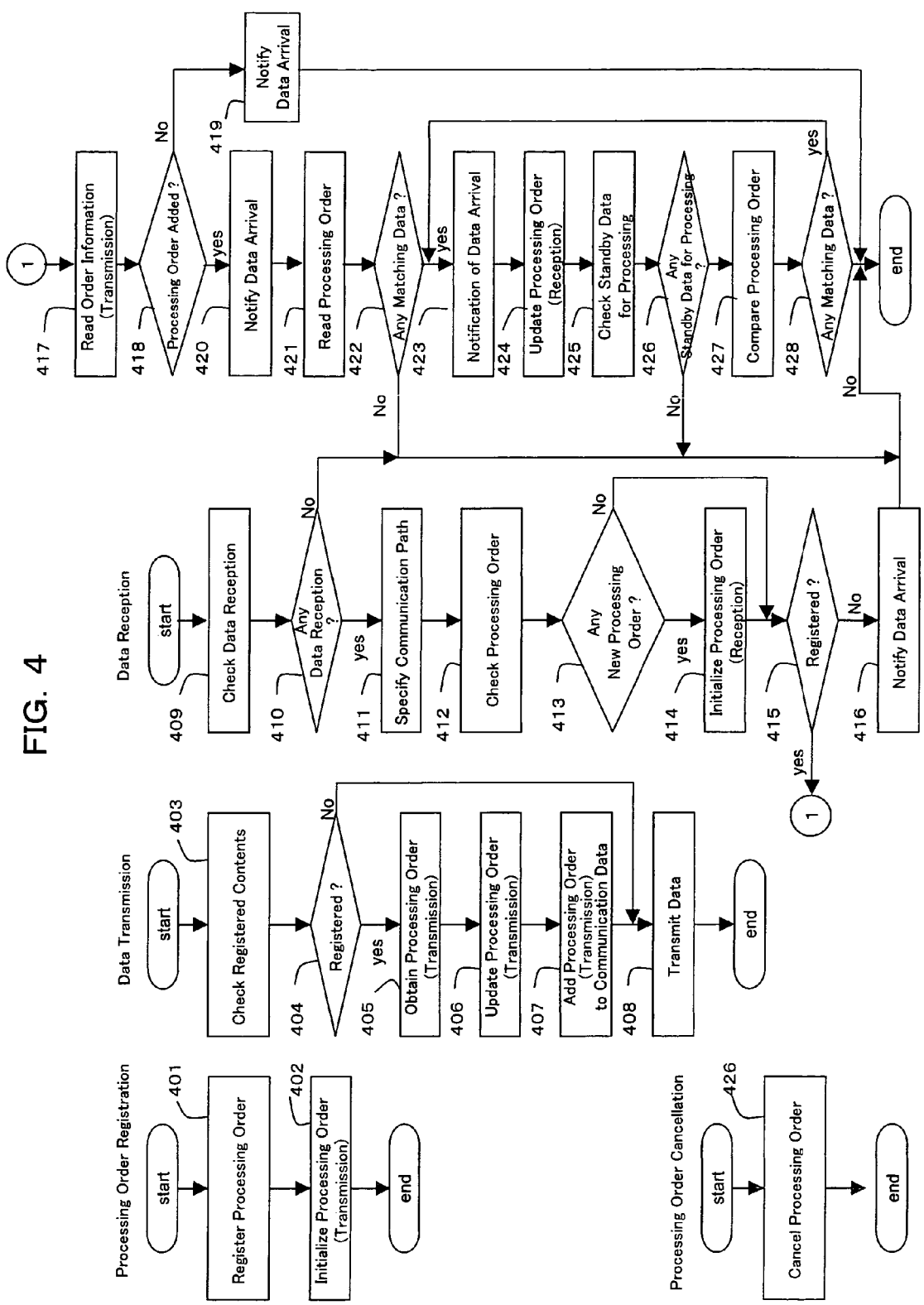
FIG. 4 is a flowchart for showing the control of the inter-module communication apparatus according to the first embodiment.

FIG. 4 is a flowchart for showing an example of an operational flow when there is the processing order generated in the communication paths. By referring to the block diagrams of FIG. 1-FIG. 3 and the flowchart of FIG. 4, described is a data transmission/reception operation performed between the communication paths having the processing order according to this embodiment.

Transmission Preparatory Operation

In the communication data to be transmitted to the second module 105 (reception side) through a plurality of communication paths, the first module 104 (transmission side) judges whether or not the processing order is necessary between the communication paths to be used for the communication. If it is judged that the processing order is necessary, the first module 104 notifies the required processing order of the communication paths to the processing order relevance register 112 and requests the registration.

The processing order relevance register 112 executes the following processing in response to the request from the first module 104. That is, the processing order relevance register 112 registers the processing order as the processing order information 119 to the registered content 120 which, while being disclosed to both processors 101, 102, is set in the processing order relating device 111 (a step 401). In response to newly set processing order information 119, the processing order information managing device 114 initializes the managed processing order (transmission) (a step 402). In other words, the registered processing order (transmission) is updated to the newly set processing order (transmission). The update herein solely means to add the processing order but not to update the data which already has been recorded.

Transmission Operation

A transmission operation is carried out after completing the transmission preparatory operation as described above. The following description is presented on assumption that, in the step 401, the processing order information 119 regarding the communication path 108 and the communication path 109 is registered to the registered content 120 of the processing order relating device 111.

When the first module 104 transmits the communication data through the transmission unit 106, the processing order information checking device 113 checks the registered content 120 which is registered to the processing order relating device 111 (steps 403, 404). When the processing order information checking device 113 confirms that the processing order information 119 is registered to the registered content 120 as a result of the checking processing by the steps 403, 404, the processing order information adder 115 obtains the processing order information (transmission) from the processing order information managing device 114 (a step 405). In this state, the processing order (transmission) is initialized by the processing order information managing device 114 through the processing of the step 402 which is performed earlier.

The processing order information managing device 114 updates the contents of the stored processing order (transmission) every time the processing order (transmission) is read out by the processing order information adder 115 (a step 406). An update is repeatedly carried out every time the processing order information adder 115 reads out the processing order (transmission). As an example of the configuration, the processing order and the processing order (transmission) are formed based on processing number information.

The processing order information adder 115 adds the read-out processing order (transmission) to the processing order information 123 which is in the data information managing area 121 of the communication data (a step 407).

After the processing order information adder 115 adds the processing order (transmission) to the communication data, the transmission unit 106 reads the data information managing area 121 of the communication data to be transmitted thereafter. Thereby, the transmission unit 106 finds the communication path 108 and the communication path 109 designated by the communication data and transmits the communication data to the reception unit 107 through the obtained communication path 108 and the communication path 109 (a step 408).

Reception Operation

The reception unit 107 monitors whether or not the communication data has arrived in all the communication paths 108, 109, and 110 (steps 409, 410). Upon confirming the arrival of the communication data by the processing of the step 409 and the step 410, the reception unit 107 specifies the communication path to which the communication data has arrived (a step 411).

When the communication path where the communication path has arrived is specified by the step 411, the reception processing relevance checking device 116 makes an inquiry to the processing order relating device 111 for checking the processing order information 119 (steps 412, 413).

Upon confirming that the new registered content is registered to the processing order information 119 (i.e. the registered content 120 regarding the communication path having the new processing order being set is registered) by the processing of the steps 412, 413, the reception processing relevance checking device 116 notifies it to the reception order information managing device 118. Upon receiving the notification, the reception order information managing device 118 judges that the managed processing order (reception) is old information and is not consistent with the registered content 120 of the current processing order information 119, thus initializing the processing order (reception). In short, the processing order (reception) is rewritten to the order in accordance with the current registered content 120 (a step 414). In other words, there may be a case where the communication path whose processing order is defined by the registered content 120, which is additionally registered to the processing order information 119, matches the communication path whose processing order is defined by the already-registered processing order (reception). In that case, the processing order (reception) regarding the matched communication path is considered as the old information as described above. Thus, the processing order is initialized. However, there may be a case where communication path whose processing order is defined by the registered content 120, which is additionally registered to the processing order information 119, is completely different from the communication path whose processing order is defined by the already-registered processing order (reception). In that case, the registered content 120 which is additionally registered to the processing order information 119 is processed to be added to the processing order (reception) For example, let's assume that the processing orders (reception) for two communication paths "A", "B" have already been registered, and that processing orders regarding other two communication paths "C", "D" are to be registered subsequently to the processing order information 119. In this case, the processing orders (reception) of the communication paths "A", "B" are not initialized since they can be used as they are, while the processing orders regarding the two communication paths "C", "D" are additionally written to the processing order (reception).

After executing the judging processing of the step 413 and the initializing processing of the processing order (reception) in the step 414 based thereupon, the reception processing relevance checking device 116 judges whether or not the processing order of the communication path where the communication data has currently arrived is registered to the registered content 120 of the current processing order information 119 (a step 415).

Upon confirming in the step 415 that there is no processing order registered regarding the communication path with the arrived communication data, the reception processing relevance checking device 116 notifies the arrival of the communication data to the second module 105 (a step 416). Upon receiving this notification, the second module 105 and the reception unit 107 judge that the processing order is not registered to the received communication data, and perform regular reception processing which is not affected by the processing order.

In the meantime, upon confirming in the step 415 that the processing order regarding the communication path to which the communication data has arrived is registered to the registered content 120 of the current processing order information 119, the reception processing relevance checking device 116 notifies the processing order information analyzer 117 about the registration. Upon receiving the notification, the processing order information analyzer 117 reads out the processing order (reception) registered to the reception order information managing device 118 (a step 417). Further, the processing order information analyzer 117 judges whether or not the processing order (reception) is added to the processing order (transmission) storage area 123 of the received communication data (a step 418).

When it is judged in the step 418 that the processing order (transmission) is not added to the processing order (transmission) storage area 123 of the received communication data, the processing order information analyzer 117 judges that there is no processing order set in the communication path for the received communication data, and notifies the arrival of the communication data to the second module 105 (a step 419). Upon receiving this notification, the second module 105 and the reception unit 107 judge that the processing order is not registered to the received communication data, and perform regular reception processing which is not affected by the processing order.

When it is judged in the step 418 that the processing order (transmission) is added to the processing order (transmission) storage area 123 of the received communication data, the processing order information analyzer 117 reads out the processing order (transmission) added to the communication data (a step 420), and compares the read out processing order (transmission) and the processing order (reception) stored in the reception order information managing device 118 (steps 421, 422).

When it is judged in the comparative processing of the steps 421, 422 that the processing order (reception) and the processing order (transmission) are different, the processing order information analyzer 117 judges that the communication data, which relates to the received communication data and also is to be processed prior to the communication data, has not arrived yet. Based on such judgment, the processing order information analyzer 117 treats the received communication data as the standby data for processing, and waits for the arrival of next communication data.

In the meantime, when it is judged in the steps 421, 422 that the processing order (transmission) and the processing order (reception) are consistent, the processing order information analyzer 117 judges that the communication data compliant with the processing order has arrived and notifies the arrival of the communication data to the second module 105 (a step 423). Further, the processing order (reception) registered to the processing order information managing device 118 is updated (a step 424).

After updating the processing order (reception), the processing order information analyzer 117 checks whether or not there still remains the standby data for processing in the updated processing order (reception) (steps 425, 426). When it is judged in the processing of the steps 425, 426 that there is no standby data for processing, the processing order information analyzer 117 notifies it to the second module 105. Upon receiving the notification, the second module 105 ends a series of reception operations relating to the communication data.

In the meantime, when it is judged in the processing of the steps 425, 426 that there still remains the standby data for processing, the processing order information analyzer 117 compares the received processing order (transmission) with the respective processing order (reception) of the standby data for processing (steps 427, 428). When there is the processing order (reception) having the contents consistent with the received processing order (transmission), the processing order information analyzer 117 judges that it is the timing for processing the standby data, and repeatedly executes a series of reception processing of the steps 432-427.

When it is judged in the steps 427, 428 that there is no processing order (reception) which has the contents consistent with that of the received processing order (transmission), the processing order information analyzer 117 judges that the communication data received this time is the remaining standby data for processing, though it is the communication data to be received later but not at this point, and that the communication data which is to be received at the earliest has not yet arrived. Upon such judgment, the processing order information analyzer 117 treats the communication data received this time as the standby data for processing, and keeps the setting of the state (processing order (reception)) of the remaining standby data for processing as it is for waiting the arrival of the next communication data.

When the processing order becomes unnecessary for the communication data to be transmitted to the second module 105 from the first module 104, the processing order relevance register 112 cancels the processing order which is registered to the processing order relating device 111 (a step 426).

With the above-described configuration, it becomes possible to perform data communication based on the processing order only when there is processing order present for the communication data to be transmitted between the communication paths, and to perform a conventional high-speed communication when there is no processing order required. Thereby, it is possible to achieve the inter-module communication which is the optimum for the communication state of the modules.

The first embodiment has been described by referring to the case where there are processing orders set in two communication paths. However, the first embodiment can be achieved similarly in the case where there are processing orders in three or more communication paths. Further, a plurality of numbers of processing orders may be registered to the processing order relating device 111. In that case, one processing order (transmission) and one processing order (reception) are allotted to each registered content 120 of the processing order information 119, respectively. The updates of the processing order (transmission) and the processing order (reception) are carried out at the timing of transmitting or receiving the communication data in each communication path where the processing order is set.

Further, although the transmission order relating device 112, the transmission processing relevance checking device 113, the processing order information adder 115, and the processing order information managing device 114 are formed to be the structures within the transmission unit 106, they may be provided separately from each other. Furthermore, although the reception processing relevance checking device 116, the processing order information relating device 117, and the reception order information managing device 118 are formed to be the structures within the reception unit 107, they may be the provided separately from each other.

In the first embodiment, the first module 104 and the second module 105 are to operate on the first processor 101 and the second processor 102, respectively. However, the second module may operate on the first processor 101. In that case, the reception unit 107 is provided to the first processor 101.

SECOND EMBODIMENT

Figure 5:
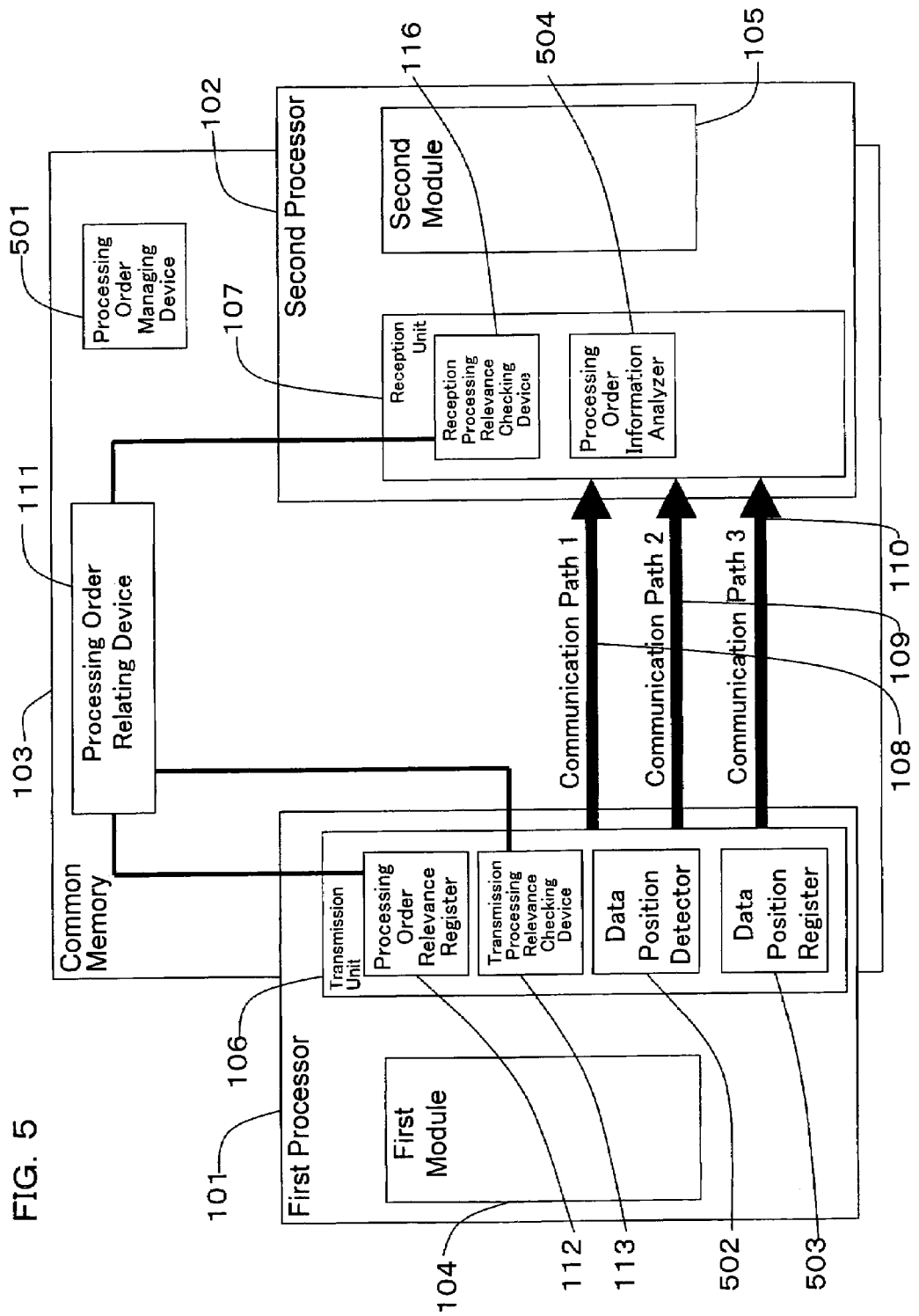
FIG. 5 is a block diagram of an inter-module communication apparatus according to a second embodiment of the present invention.

FIG. 5 shows the structure of an inter-module communication apparatus according to a second embodiment of the present invention. In FIG. 5, the apparatus for performing the inter-module communication comprises a first processor 101, a second processor 102, and a common memory 103.

On the first processor 101, a first module 104 operates as a module for transmitting communication data. On the second processor 102, a second module 105 operates as a module for receiving the communication data from the first module 104.

The first processor 101 has a transmission unit 106 mounted for transmitting the communication data from the first module 104 to the second module 105. The second processor 102 has a reception unit 107 mounted for receiving the communication data from the first module 104 in the second module 105.

Reference numerals 108, 109, and 110 are communication paths. These communication paths 108, 109, and 110 are connected to the transmission unit 106 and the reception unit 107 for transmitting data the form the transmission unit 106 to the reception unit 107.

Reference numeral 111 is a processing order relating device. The processing order relating device 111 registers processing order when there is the processing order in the data to be transmitted through the communication paths 108,109 and 110. The processing order relating device 111 is set in the common memory 103.

Reference numeral 501 is a processing order managing device for managing the communication data which has a processing order. The processing order managing device 501 is set in the common memory 103.

The transmission unit 106 comprises a processing order relevance register 112, a transmission processing relevance checking device 113, a data position detector 502, and a data position register 503.

The processing order relating device 112 registers, to the processing order relating device 111, the communication paths having the processing order set for the communication data. The transmission processing relevance checking device 113 obtains the communication path registered to the processing order relating device 111. The data position detector 502 detects the position of the communication data to be registered to the processing order managing device 501. The data position register 503 registers, to the processing order managing device 501, the position (the position according to time sequence) of the communication data which is detected by the data position detector 502.

The reception unit 107 comprises a reception processing relevance checking device 116 and a processing order information analyzer 504. The reception processing relevance checking device 116 obtains the communication path registered to the processing order relating device 111. The processing order information analyzer 504 obtains the communication data registered to the processing order managing device 501 and analyzes the data which is to be processed next between the communication paths registered to the processing order relating device 111.

The structure of the processing order relating device 111 is the same as that of the first embodiment shown in FIG. 2.

Figure 6:
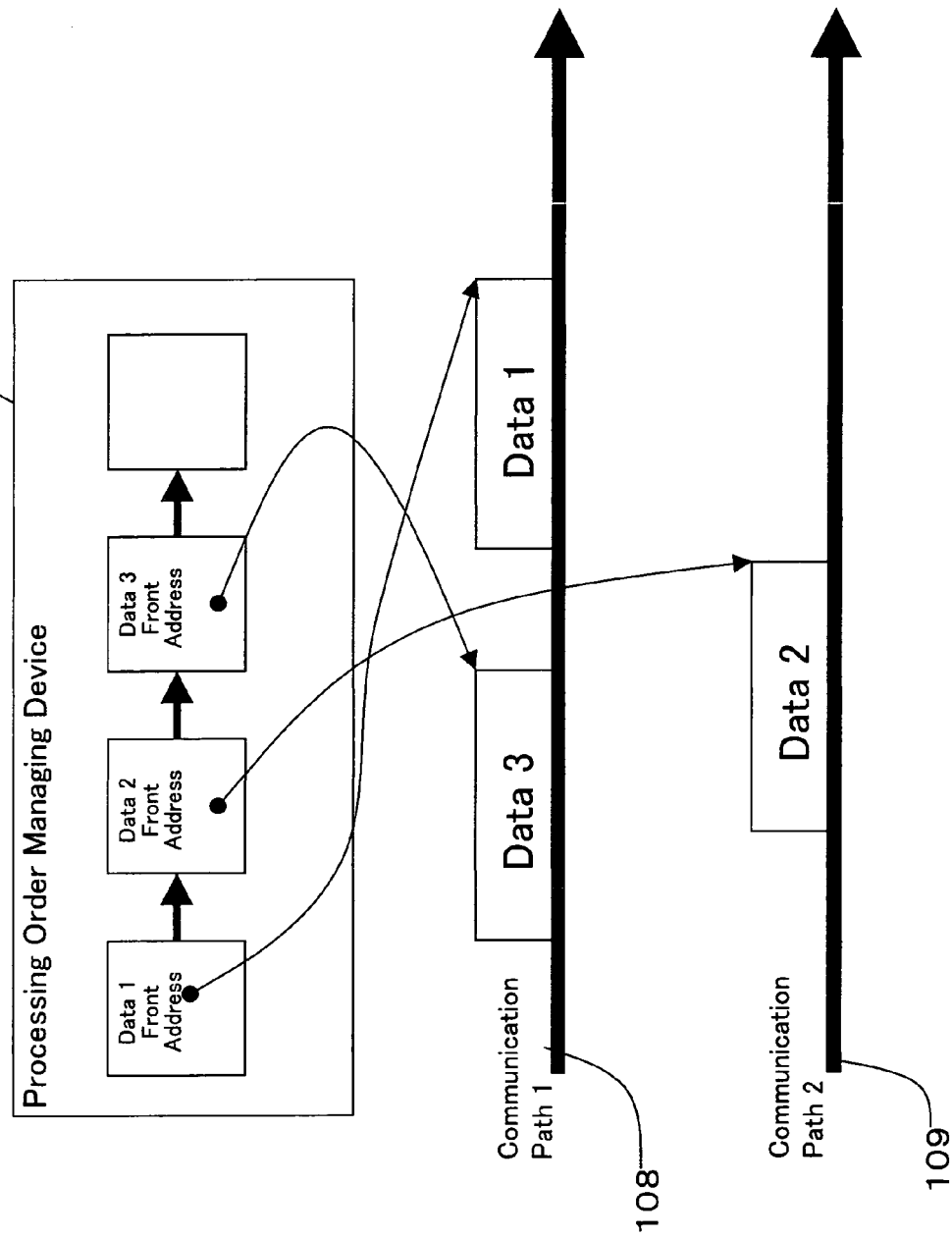
FIG. 6 is a block diagram of a processing order relating device according to the second embodiment of the present invention.

FIG. 6 shows an example of the structure of the processing order managing device 501 of the present invention. In a state where there is the processing order in the communication path 108 and the communication path 109, the processing order managing device 501 manages the order by registering, to an order list, the front address of the communication data which is transmitted to the communication paths 108 and 109. When new communication data is added by the data position register 503, the processing order managing device 501 adds the communication data at the end of the order list. For analyzing the order list, the processing order information analyzer 504 searches from the first data.

Figure 7:
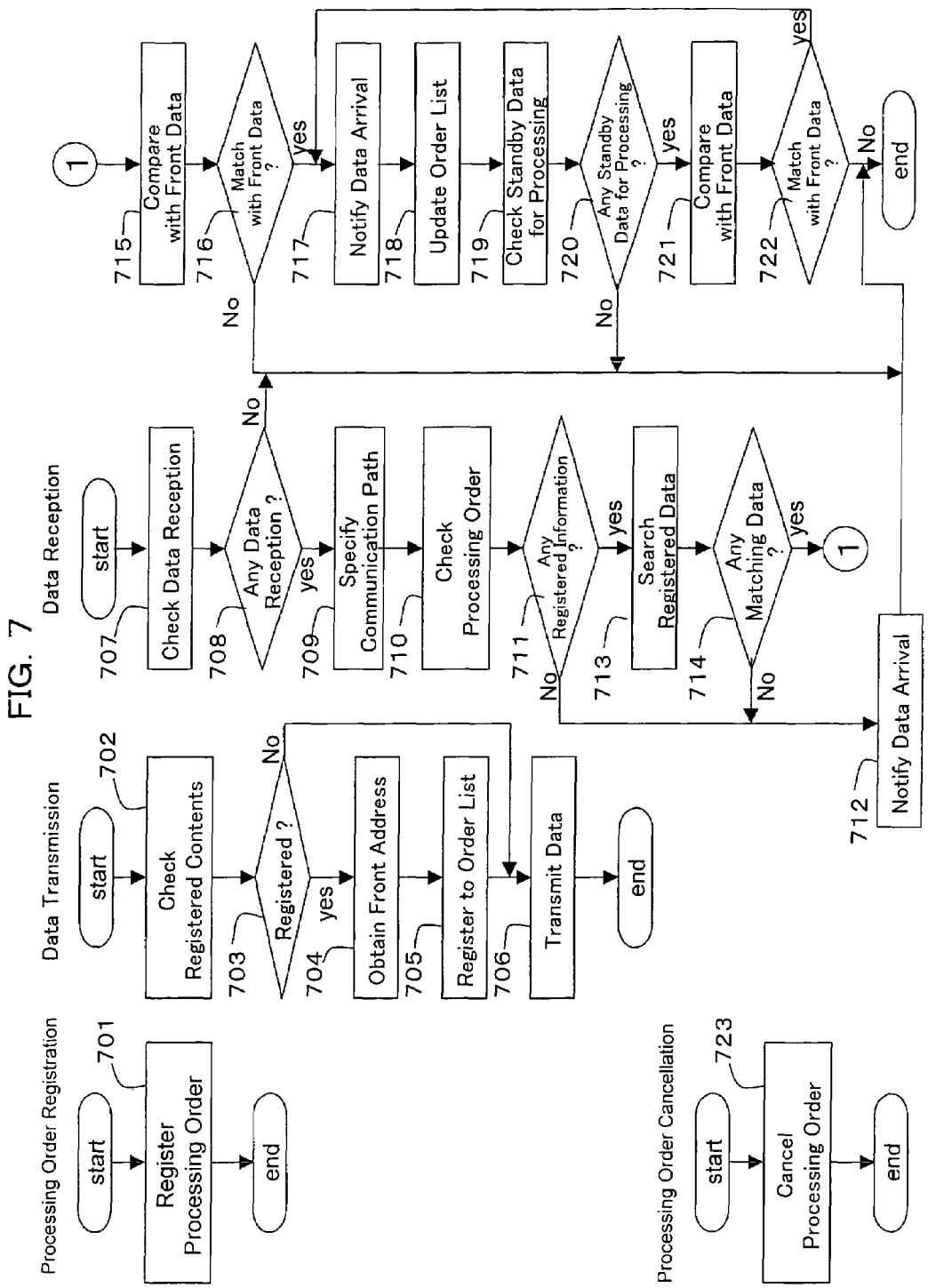
FIG. 7 is a flowchart for showing the control of the inter-module communication apparatus according to the second embodiment.

By referring to the block diagrams of FIG. 2-FIG. 6 and a flowchart of FIG. 7, described is a data transmission/reception operation performed between the communication paths having the processing order. FIG. 7 is a flowchart for showing an example of the operational flow when there is the processing order generated in the communication paths.

Transmission Preparatory Operation

In the communication data to be transmitted to the second module 105 (reception side) through a plurality of communication paths, the first module 104 (transmission side) judges whether or not the processing order is necessary between the communication paths to be used for the communication. If it is judged that the processing order is necessary, the first module 104 notifies the required processing order of the communication paths to the processing order relevance register 112 and requests the registration.

The processing order relevance register 112 executes the following processing in response to the request from the first module 104. That is, the processing order relevance register 112 registers the processing order as the processing order information 119 to the registered content 120 which, while being disclosed to both processors 101, 102, is set in the processing order relating device 111 (a step 701).

Transmission Operation

A transmission operation is carried out after completing the transmission preparatory operation as described above. The following description is presented on assumption that the processing order regarding the communication path 108 and the communication path 109 is registered to the registered content 120 of the processing order information 119.

When the first module 104 transmits the communication data through the transmission unit 106, the transmission processing relevance checking device 113 checks the registered content 120 registered to the processing order relating device 111 (steps 702, 703). When the transmission processing relevance checking device 113 confirms that the processing order information 119 is registered to the registered content 120 as a result of the checking processing by the steps 702, 703, the data position detector 502 obtains the front address of the communication data to be transmitted (a step 704).

Information of the front address (referred to as front address information hereinafter) which is obtained by the data position detector 502 is additionally registered to the end of the order list in the processing order managing device by the data position detector 503 (a step 705). After adding the front address of the communication data to the order list of the processing order managing device 501 by the data position register 503, the transmission unit 106 transmits the communication data to the designated communication path 108 or communication path 109 (a step 706).

Reception Operation

The reception unit 107 monitors whether or not the communication data has arrived in all the communication paths 108, 109 and 110 (steps 707, 708). Upon confirming the arrival of the communication data by the processing of the step 707 and the step 708, the reception unit 107 specifies the communication path to which the communication data has arrived (a step 709).

Then, the reception processing relevance checking device 116 checks whether or not the specified communication path is registered to the processing order relating device 111 (steps 710, 711).

Upon confirming in the processing of the steps 710, 711 that it is the communication path which is not registered to the processing order relating device 111, arrival of the communication is notified to the second module 105 (a step 712). In the meantime, upon confirming that it is the communication path registered to the processing order relating device 111, the processing order information analyzer 504 searches the order list which is registered to the processing order managing device 501 (steps 713, 714).

When it is judged by the processing of the steps 713, 714 that the information regarding the received communication data is not in the order list (there is no matching data) of the processing order managing device 501, the processing order information analyzer 504 judges that the received communication data is transmitted without having the processing order. Upon such judgment, the processing order information analyzer 504 notifies the arrival of communication data to the second module 105.

In the meantime, when it is judged by the processing of the steps 713, 714 that the information regarding the received communication data is in the order list (there is the matching data) of the processing order managing device 501, the processing order information analyzer 504 checks whether or not the received communication data is placed in the front of the order list (whether or not it is the data to be processed first) (steps 715, 716).

When it is judged by the processing of the steps 715, 716 that the received communication data is not placed as the front data of the order list, the processing order information analyzer 504 judges that the communication data is in compliance with the set processing order, though it is not the data to be processed first. Thus, the received data is treated as the standby data for processing until the arrival of the next communication data.

In the meantime, when it is judged by the processing of the steps 715, 716 that the received communication data is the front data of the order list, the processing order information analyzer 504 judges that the communication data to be processed has arrived and notifies the arrival of the communication data to the second module 105 (a step 717). At this time, the front data registered to the processing order managing device 501 is cancelled from the order list and moves up the orders of the remaining processing in the order list (a step 718).

After updating the order list, presence of the standby data for processing is cheeked (steps 719, 720). When it is judged by the processing of the steps 719, 720 that there is the standby data for processing remained, the processing order information analyzer 504 compares all the remaining standby data for processing with the front data stored in the order list (steps 721, 722).

When it is judged by the processing of the steps 721, 722 that one of the remaining standby data for processing matches the front data, the processing order information analyzer 504 judges that the one of the standby data for processing becomes the front of the order list (becomes the communication data to be processed first), and repeatedly executes a series of processing from the step 717 to the step 722.

In the meantime, when it is judged by the processing of the steps 721, 722 that none of the remaining standby data for processing matches the front data, the processing order information analyzer 504 judges that the communication data to be processed next has not arrived yet and waits for the arrival of the next standby data for processing.

When the processing order becomes unnecessary for the communication data to be transmitted to the second module 105 from the first module 104, the processing order relevance register 112 cancels the processing order which is registered to the processing order relating device 111 (a step 723).

With the above-described configuration, it becomes possible to perform data communication based on the processing order only when there is processing order set for the communication data, and to perform a conventional high-speed communication when there is no processing order. Thereby, it is possible to achieve the inter-module communication which is the optimum for the communication state between the modules.

In the first embodiment, the processing order information is added to the communication data thus increasing the data amount flown in the communication paths. However, in the second embodiment, only the amount of the data which is initially required for that communication may be transmitted as the data amount to be flown in the communication paths. Thus, there is no increase in the communication amount.

The second embodiment has been described by referring to the case where there are processing orders in two communication paths. However, the second embodiment can also be achieved in the case where there are processing orders in three or more communication paths. Further, there may be a plurality of processing orders registered to the processing order relating device 111. In that case, each order list is registered to the processing order managing device 501 to be managed. Therefore, update of the registered content 120 in the processing order information 119 is carried by every individual order list.

Further, although the processing order relating device 112, the transmission processing relevance checking device 113, the data position detector 502, and the data position register 503 are formed to be the structures within the transmission unit 106, they may be provided separately from each other. Furthermore, although the reception processing relevance checking device 116 and the processing order information analyzer 504 are formed to be the structures within the reception unit 107, they may be provided separately from each other.

In the description of the second embodiment, the first module 104 and the second module 105 are to operate on the first processor 101 and the second processor 102, respectively. However, the second module 105 may operate on the first processor 101. In that case, the reception unit 107 is provided to the first processor 101.

THIRD EMBODIMENT

Figure 8:
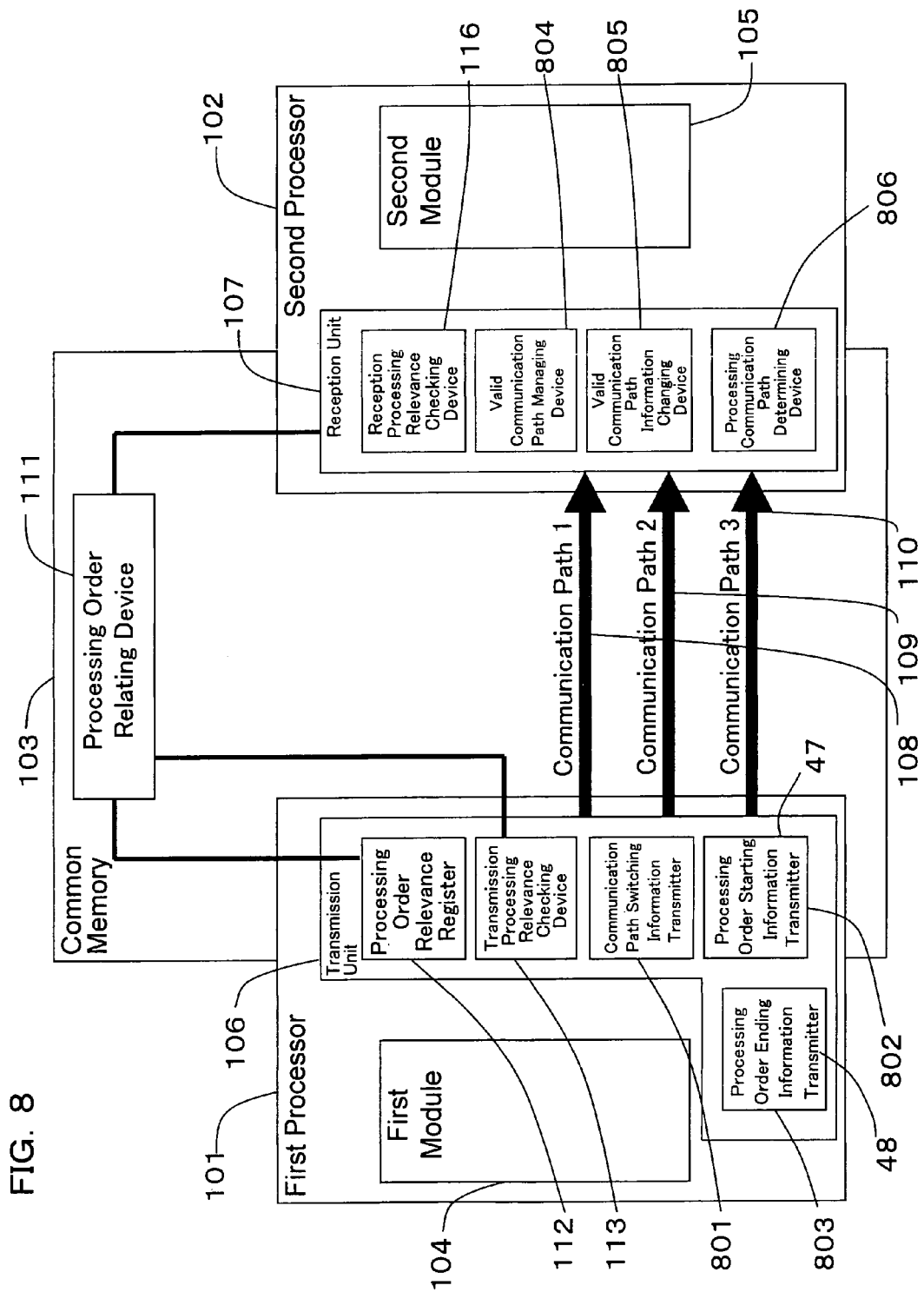
FIG. 8 a block diagram of an inter-module communication apparatus according to a third embodiment of the present invention.

FIG. 8 shows the structure of an inter-module communication apparatus according to a third embodiment of the present invention. In FIG. 8, the apparatus for performing the inter-module communication comprises a first processor 101, a second processor 102, and a common memory 103.

On the first processor 101, a first module 104 operates as a module for transmitting communication data. On the second processor 102, a second module 105 operates as a module for receiving the communication data from the first module 104.

There is provided a transmission unit 106 as a device for transmitting the communication data from the first module 104 to the second module 105. The transmission unit 106 is mounted to the first processor 101. A reception unit 107 is provided as a device for receiving the communication data from the first module by the second module 105. The reception unit 107 is mounted to the second processor 102. Reference numerals 108, 109, and 110 are communication paths. These communication paths 108, 109, and 110 are connected to the transmission unit 106 and the reception unit 107 for transmitting the data form the transmission unit 106 to the reception unit 107.

Reference numeral 111 is a processing order relating device. The processing order relating device 111 registers processing order when there is the processing order in the data to be transmitted through the communication paths 108,109 and 110. The processing order relating device 111 is set in the common memory 103.

The transmission unit 106 comprises a processing order relevance register 112, a transmission processing relevance checking device 113, a communication path switching information transmitter 801, a processing order starting information transmitter 802, and a processing order ending information transmitter 803.

The communication paths having the processing order set in the processing order relating device 111 are registered to the processing order relating register 112. The transmission processing relevance checking device 113 obtains the information regarding the communication paths which are registered to the processing order relating device 111. The communication path switching information transmitter 801 adds to the communication data the information for changing the communication path to be used, which is registered to the processing order relating device 111, to another communication path. The processing order starting information transmitter 802 transmits to the reception unit 107 the information regarding the start position in the communication path registered to the processing order relating device 111, at which the registration becomes valid. The processing order ending information transmitter 803 transmits to the reception unit 107 the information regarding the end position in the communication path registered to the processing order relating device 111, at which the registration becomes invalid.

The reception unit 107 comprises a reception processing relevance checking device 116, a valid communication path managing device 804, a valid communication path changing device 805, and a processing communication path determining device 806.

The reception processing relevance checking device 116 obtains the setting of the communication paths registered to the processing order relating device 111. The valid communication managing device 804 manages the information regarding the valid communication path among the communication paths registered to the processing order relating device 111. Upon receiving the communication path switching information from the information regarding the communication paths, which is managed by the valid communication path managing device 804, the valid communication path information changing device 805 performs processing for switching the communication path managed by the valid communication path managing device 804 to the valid communication path based on the communication path switching information. The processing communication path determining device 806 determines the communication path for reception among the communication paths managed by the valid communication path managing device 804.

Figure 9:
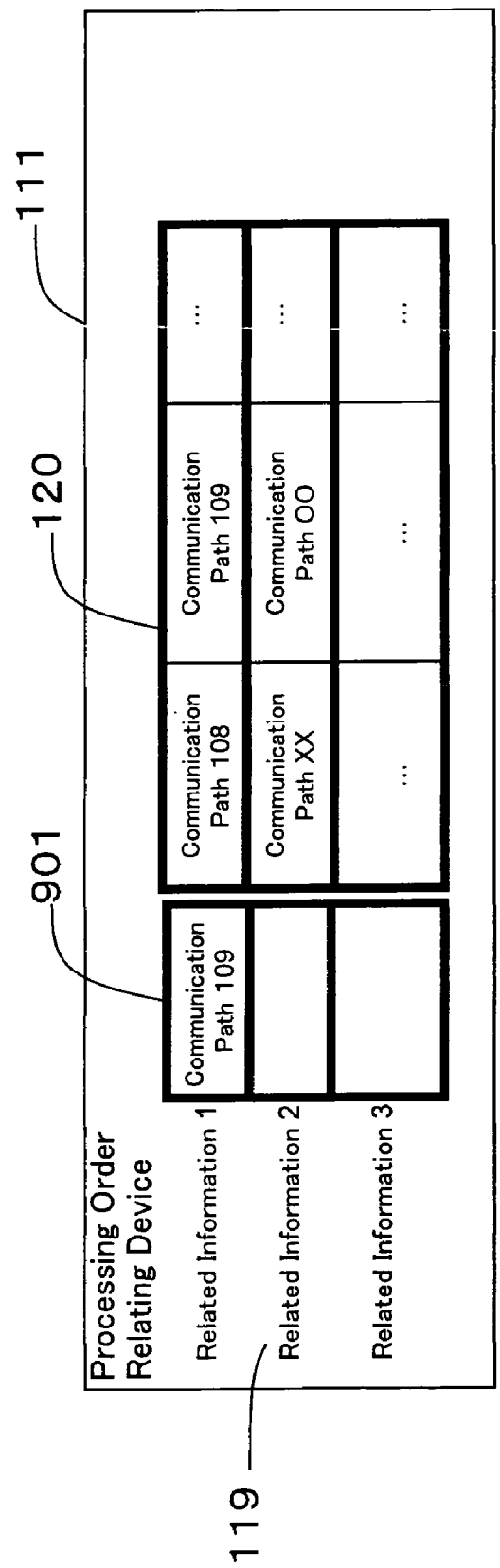
FIG. 9 is a block diagram of a processing order relating device according to the third embodiment of the present invention.

FIG. 9 shows an example of processing order information which is set in the processing order relating device 111 of this embodiment. In FIG. 9, the processing order information contains valid communication path information 901 in addition to the information of the first embodiment as shown in FIG. 2. Registered to the valid communication path information 901 is the communication path which becomes valid first (communicated at the very first) among the communication path group registered as having the same processing order to the processing order relevance register 112.

Figure 10:
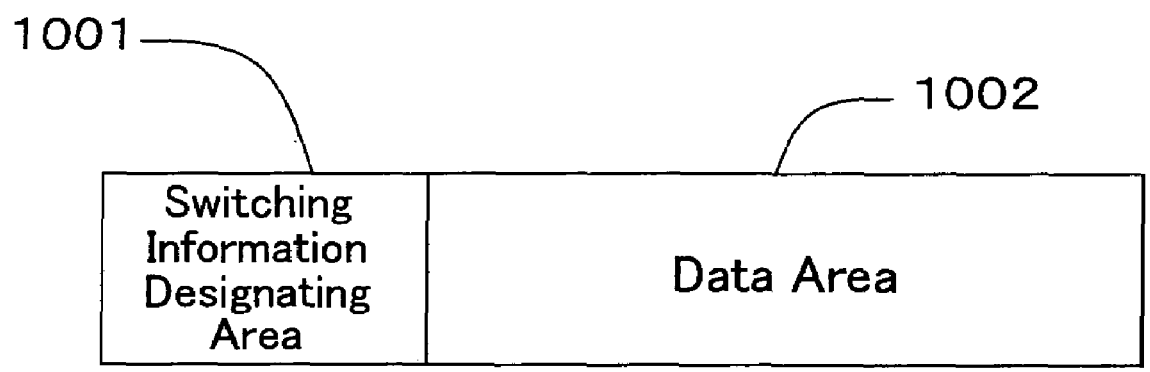
FIG. 10 is a block diagram of the structure of communication data according to the third embodiment.

FIG. 10 shows an example of data format of the communication data which is transmitted from the transmission unit 106 to the communication path 108, the communication path 109, and the communication path 110, and received by the reception unit 107. In the case of FIG. 10, the communication data includes a switching information designating area 1001 and a data area 1002. As an example of the designating information, the following data is stored in the switching information designating area 1001. That is, when "0" is stored, it indicates that, in the data area 1002, there is the data which is to be transmitted to the second module from the reception unit 107. When "1" is stored, the valid communication path switching information is stored in the data area 1002.

Figure 11:
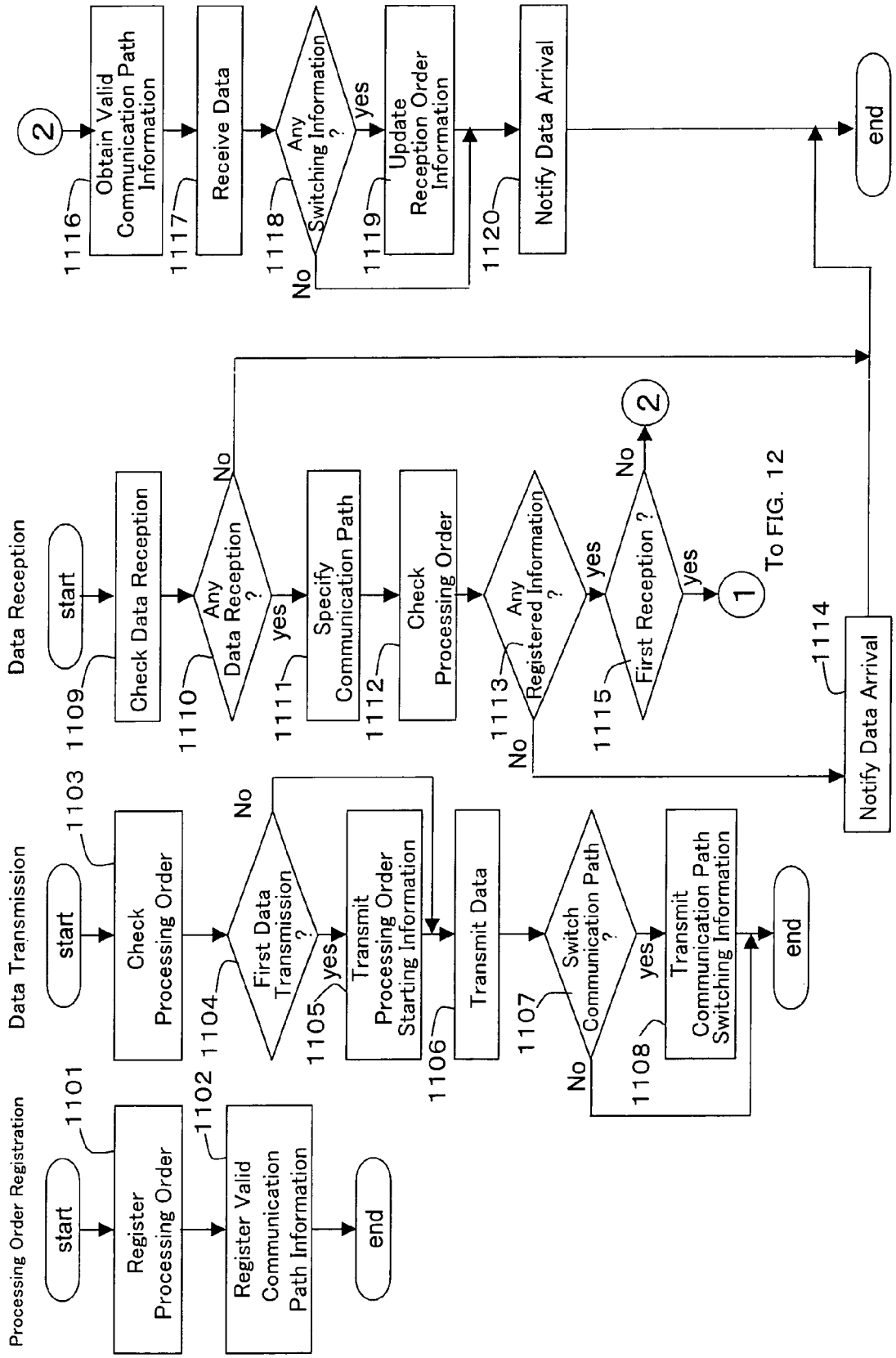
FIG. 11 is a flowchart for showing the control of the inter-module communication apparatus according to the third embodiment.

FIG. 11 and FIG. 12 are flowcharts for showing examples of the operational flow when the processing order is set between the communication paths. By referring to the block diagrams of FIG. 8, FIG. 9, and the flowcharts of FIG. 11, FIG. 12, described is a data transmission/reception operation performed between the communication paths having the processing order according to the third embodiment.

Transmission Preparatory Operation

For the communication data transmitted from the first module 104 to the second module 105, it is judged whether or not the processing order is required between the communication paths to be used for the communication. This judgment is carried out by the first module 104. When it is judged that the processing order is necessary, the first module 104 notifies the required processing order of the communication paths to the processing order relevance register 112 and request the registration.

The processing order relevance register 112 executes the following processing in response to the request from the first module 114. That is, the processing order relevance register 112 registers the communication path which requires the processing order to the registered content 120 of the processing order relating device 111 (a step 1101). At this time, among the communication paths having the processing order, the information of the communication path (valid communication path information 901) whose transmission/reception processing is carried out first is also registered (a step 1102).

In the third embodiment, the communication path 108 and the communication path 109 are registered to the registered communication path information 120. In addition, the communication path 109 is registered to the valid communication path information 901.

Transmission Operation

A transmission operation is carried out after completing the transmission preparatory operation as described above. In this state, the first module 104 transmits the communication data through the transmission unit 106. At that time, first, the transmission processing relevance checking device 113 checks the communication path having the processing order registered to the processing order relating device 111 (a step 1103). When it is confirmed by the processing of the step 1103 that the processing order is registered to the processing order relating device 111, it is judged whether or not the transmission of the current communication data is the transmitting action to be carried out first after the processing order is registered. This judgment is carried out by for example, the transmission processing relevance checking device 113.

When it is judged in the step 1103 to be the first data transmission, the processing order starting information transmitter 802 transmits the processing order starting information to the communication path groups (the communication path 108 and the communication path 109 in the third embodiment), having the order defined by the processing order (a step 1105).

After the processing order starting information is transmitted by the step 1105, the transmission processing relevance checking device 113 determines the valid communication path by referring to the valid communication path information 901 of the processing order relating device 111. The transmission unit 106, through the communication path (the communication path 109 at this point) judged as the valid communication path by the transmission processing relevance checking device 113, transmits the communication data to the reception unit 107 (a step 1106). After transmitting the communication data, the transmission processing relevance checking device 113 judges whether or not to change the registered content of the valid communication path information 901 (a step 1107). Judgment of changing the valid communication path information 901 is carried out by collating the current valid communication path information 901 with the registered content 120 of the processing order information 119.

When the transmission processing relevance checking device 113 judges in the step 1107 that it is unnecessary to switch the communication paths, the transmission unit 106 judges that a series of transmission processing of the communication data processed in that processing order has all been completed, and ends the transmission operation. In the meantime, when the transmission processing relevance checking device 113 judges in the step 1107 that it is necessary to switch the communication paths, the communication path switching information transmitter 801 transmits the next data as the communication data after the communication data is transmitted. That is, after storing "1" (indicates that there is valid communication path switching information) in the switching information designating area 1001, the communication data carrying the information for designating the communication path to be switched next, which is stored in the data area 1002, is transmitted (a step 1108). Transmission is performed through the communication path which is currently valid. After transmitting such communication data, the transmission processing is ended.

Initial Reception Operation

The reception unit 107 monitors whether or not the communication data has arrived in the communication paths 108, 109 and 110 (steps 1109, 1110). Upon confirming the arrival of the communication data by the processing of the step 1109 and the step 1110, the reception unit 107 specifies the communication path through which the communication data has transmitted (a step 1111).

When the transmission communication path is specified by the processing of the step 1111, the reception processing relevance checking device 116 checks whether or not the communication path which transmitted the communication data is registered to the processing order relating device 111 (steps 1112, 1113). When it is confirmed by the processing of the steps 1112, 1113 that the communication path which transmitted the data is not registered to the processing order relating device 111, the reception processing relevance checking device 116 judges that the processing order is not set for the arrived communication data. Thus, the reception processing relevance checking device 116 notifies the arrival of the communication data to the second module 105 (a step 1114), and a series of the initial reception operations are ended.

In the meantime, when it is confirmed by the processing of the steps 1112, 1113 that the communication path which transmitted the data is registered to the processing order relating device 111, the reception processing relevance checking device 116 carries out the following judgment. That is, the reception processing relevance checking device 116 judges whether or not the current reception operation is executed first through the communication path after the data transmitting communication path, which is confirmed to be registered, is registered to the processing order relating device 111 (a step 1115).

When the reception processing relevance checking device 116 judges in the step 1115 that it is the first reception operation, the reception unit 107 waits for the communication data, which has the processing order staring information (see the step 1105), in all the communication paths (the communication path 108 and the communication path 109 in the third embodiment, which will be referred to as registered communication paths hereinafter) which are registered to the processing order relating device 111. Specifically, it judges whether or not the communication data reaching the registered communication paths (108, 109) have the processing order starting information (a step 1201).

When it is judged in the processing of the step 1201 that the arrived communication data does not have the processing order starting information stored, the reception processing relevance checking device 116 judges that the arrived communication data is transmitted from the transmission unit 106 before the registered communication paths (108, 109) are registered to the processing order. Upon such judgment, the reception processing relevance checking device 116 notifies the arrival of the communication data to the second module 105 (a step 1202), and a series of the initial reception operations are ended.

In the meantime, when it is judged in the processing of the step 1201 that the arrived communication data has the processing order starting information, the reception processing relevance checking device 116 judges that the arrived communication data is transmitted from the transmission unit 106 after the registered communication paths (108, 109) are registered to the processing order. Upon such judgment, the reception processing relevance checking device 116 judges whether or not the processing order starting information for all the communication paths registered to the processing order relating device 111 has been received (a step 1203). The reception processing relevance checking device 116 continues a series of the initial reception operation until all the processing order starting information is received in the step 1203.

When it is judged in the step 1203 that the reception processing relevance checking device 116 has received the processing order starting information for all the communication paths being registered to the processing order relating device 111, the valid communication path managing device 804 registers the communication path (the communication path 109 in the third embodiment), which is registered to the valid communication path 901 within the processing order relating device 111, as the valid communication path (a step 1204). The reception operation as described above is the initial reception operation.

Reception Operation

In the followings, described is a regular reception operation which is performed after completing the initial reception processing. The regular data communication through the communication paths registered to the processing order relating device 111 is managed by the valid communication path managing device 804 of the reception unit 107. Thus, the reception unit 107 obtains the valid communication path information from the valid communication path managing device 804, and then receives the communication data only through the communication paths which are registered to the obtained valid communication path information 901 (steps 1116, 1117). The reception processing relevance checking device 116 and the valid communication path managing device 804 perform the reception management.

The reception unit 107, while carrying out the regular reception, judges whether or not the communication path switching information is registered to the received communication data (a step 1118). The valid communication path managing device 804 and the processing communication path determining device 806 carry out checking of the communication path switching information.

When it is confirmed in the step 1118 that the communication path switching information is registered to the received communication data, the valid communication path information changing device 805 updates the valid communication path information registered to the valid communication path managing device 804 based on the checked communication path switching information (a step 1119).

With this, the communication path which performs the next reception operation is determined based on the valid communication path information which is updated by the valid communication path managing device 804. After updating the valid communication path information, the received communication data is communicated to the second module 105 and a series of regular reception operations are ended (a step 1120). When it is confirmed in the step 1118 that the communication path switching information is not registered to the received communication data, the received communication data is communicated to the second module 105 and a series of the regular reception operations are ended without performing the update operation (the step 1119) of the valid communication path information.

When the processing order between the communication paths becomes unnecessary for the communication data transmitted from the first module 104 to the second module 105, the following operation is carried out. That is, the processing order ending information transmitter 803 of the transmission unit 106 transmits the processing order ending information to all the communication paths registered to the processing order relating device 111 (a step 1205). The transmitted processing order ending information is received by the reception unit 107. When it is confirmed that the processing order ending information is received in all the communication paths by the reception unit 107 (a step 1206), the reception processing relevance checking device 116 cancels the communication path information registered to the processing order relating device 111 (a step 1207).

With the above-described configuration, it becomes possible with the third embodiment to perform data communication based on the processing order only when there is processing order set for the communication data to be transmitted between the communication paths, and to perform a conventional high-speed communication when there is no processing order. Thereby, it is possible to achieve the inter-module communication which is the optimum for the communication state of the modules.

Further, in the first embodiment, it is necessary for the communication data to have an area for storing the processing order information. However, such area is not necessary in the third embodiment.

Furthermore, in the third embodiment, the communication path which is valid at that point is uniquely determined among the communication paths having the processing order. Thus, data can be received immediately without executing the processing for selecting the communication path.

Furthermore, the third embodiment has been described by referring to the case where there is the order information in two communication paths. However, there may be processing orders in three or more communication paths. Further, there may be a plurality of processing orders registered to the processing order relating device 111. Moreover, although the transmission order relating device 112, the transmission processing relevance checking device 113, the communication switching information transmitter 801, the processing order stating information transmitter 802, and the processing order ending information transmitter 803 are provided in the transmission unit 106, they may be provided separately from each other. Furthermore, although the reception processing relevance checking device 116, the processing order information relating device 117, the valid communication path managing information 804, the valid communication path information changing device 805, and the processing communication path determining device 806 are provided in the reception unit 107, they may be provided separately from each other.

Further, in the third embodiment, the first module 104 and the second module 105 are to operate on the first processor 101 and the second processor 102, respectively. However, the second module 105 may operate on the first processor 101. In that case, the reception unit 107 is provided to the first processor 101.

FOURTH EMBODIMENT

Figure 13:
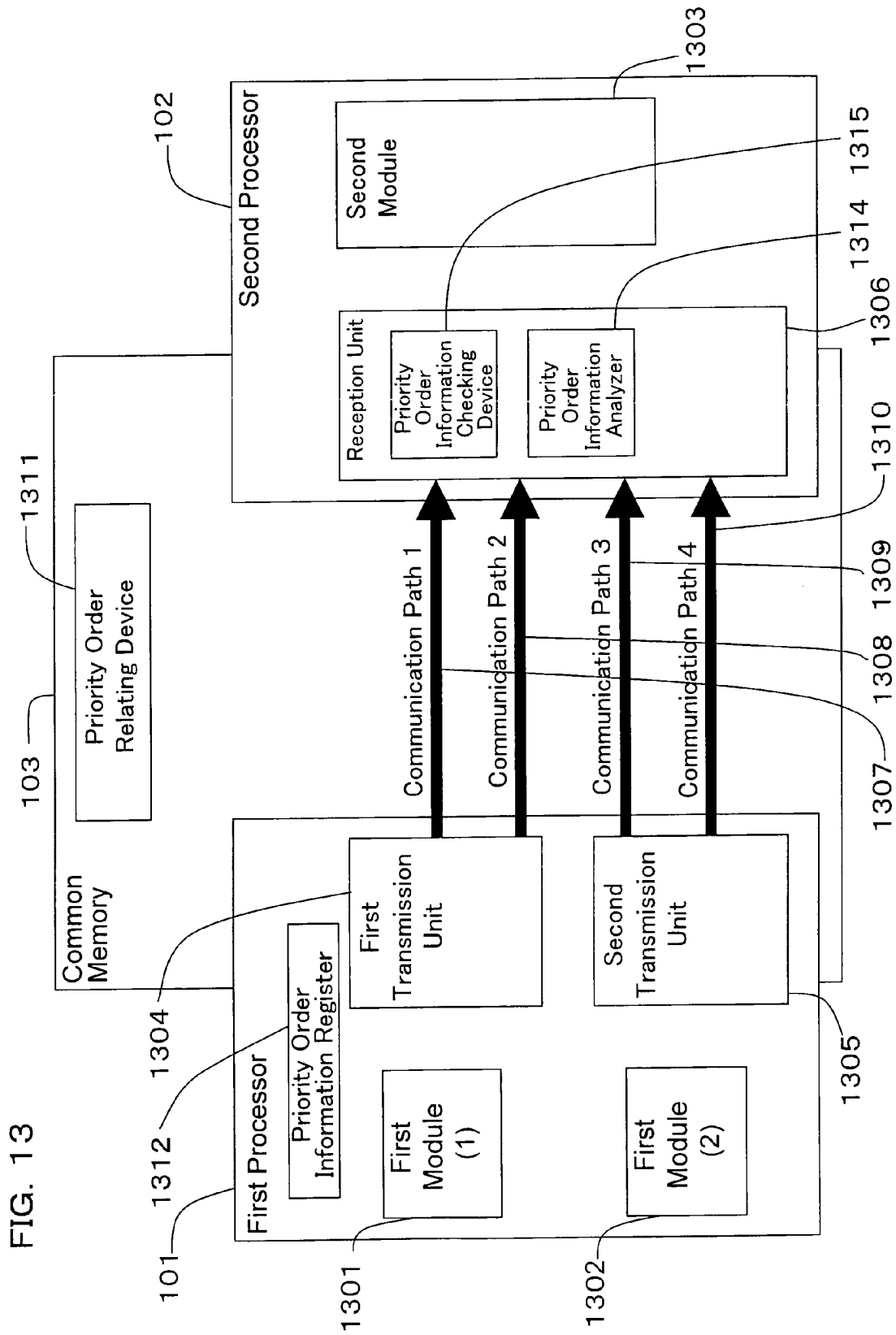
FIG. 13 a block diagram of an inter-module communication apparatus according to a fourth embodiment of the present invention.

FIG. 13 shows the structure of an inter-module communication apparatus according to a fourth embodiment of the present invention. In FIG. 13, the apparatus for performing the inter-module communication comprises a first processor 101, a second processor 102, and a common memory 103. On the first processor 101, a first module (1) 1301 and a first module (2) 1302 operate for transmitting communication data. On the second processor 102, a second module 1303 operates for receiving the communication data from the first module (1) 1301 and the first module (2) 1302.

A first transmission unit 1304 and a second transmission unit 1305 are mounted to the first processor 101. The first transmission unit 1304 transmits the communication data from the first module (1) 1301 to the second module 1303. The second transmission unit 1305 transmits the communication data from the first module (2) 1302 to the second module 1303.

A reception unit 1306 is mounted to the second processor 102. The reception unit 1306 receives the communication data transmitted from the first module (1) 1301 and the first module (2) 1302.

Reference numerals 1307, 1308, 1309, and 1310 are communication paths. The communication path 1307 and the communication path 1308 are connected to the first transmission unit 1304 and the reception unit 1306 for transmitting the communication data from the first transmission unit 1304 to the reception unit 1306. The communication path 1309 and the communication path 1310 are connected to the second transmission unit 1305 and the reception unit 1306 for transmitting the communication data from the second transmission unit 1305 to the reception unit 1306.

Reference numeral 1311 is a priority order relating device. To the priority order relating device 1311, registered is the priority order (one of the processing orders) of a communication data group transmitted from the first module (1) 1301 to the second module 1303 through the communication paths 1307, 1308, and the priority order of a communication data group transmitted from the first module (2) 1302 to the second module 1303 through the communication paths 1309, 1310. The priority order relating device 1311 is one of the processing order relating devices of the present invention.

Reference numeral 1312 is a priority order information register. The priority order information register 1312 registers the information regarding the priority order which is given to the programs operated on the first processor. When a plurality of modules operating on the first processor 101 transmit the communication data to the same modules operating on the second processor 102, the priority orders are given to those modules. The priority order information register 1312 is one of the processing order relating registers of the present invention.

Although not shown, the transmission units 1304 and 1305 basically have the same structure as that of the transmission unit 106 according to the first, second, or third embodiment described above.

Although not shown, the reception unit 1306 basically has the same structure as that of the reception unit 107 according to the first, second, or third embodiment. However, the reception unit 1306 comprises a priority order information checking device 1314, and a priority order information analyzer 1315 for determining the communication path to be processed by analyzing the priority order information which is checked by the priority order information checking device 1314. The priority order information checking device 1314 is one of the processing order relevance checking devices of the present invention. The priority order information analyzer 1315 is one of the processing order information analyzers of the present invention.

Figure 14:
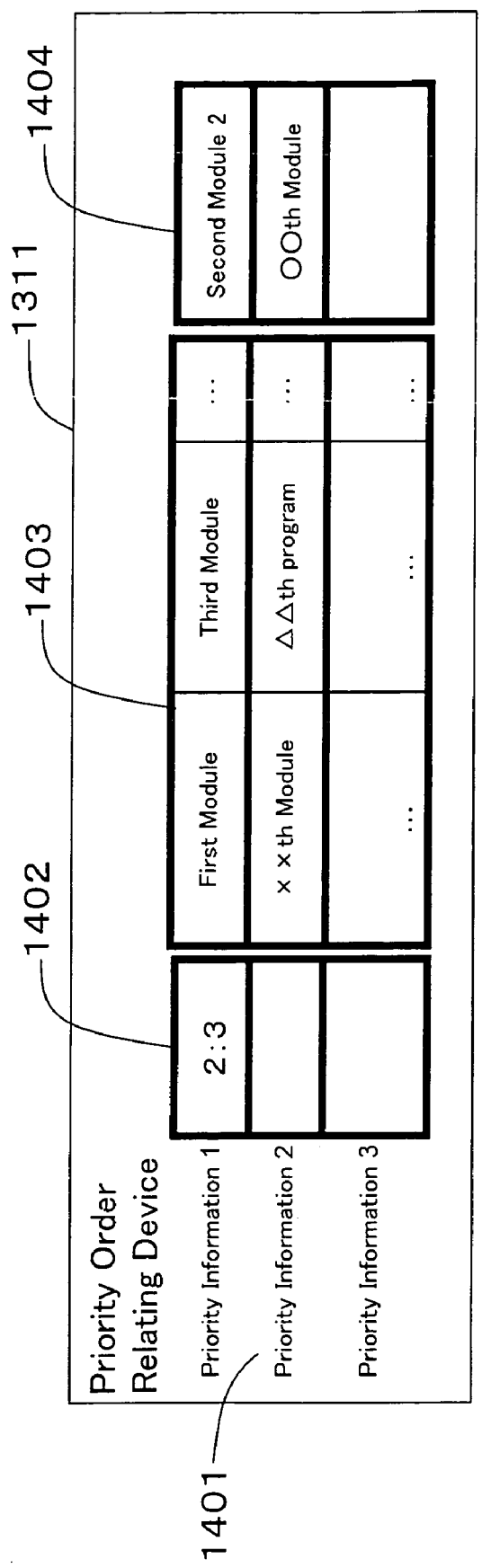
FIG. 14 is a block diagram of a priority order relating device according to the fourth embodiment.

FIG. 14 shows an example of the priority orders set in the priority order relating device 1311 of the present invention. In FIG. 14, reference numeral 1401 is priority order information. 1402 is processing ratio information of the communication paths having the same priority order. 1403 is the transmission communication path information indicating a module (program) with the priority order set on the transmission side. 1404 is the reception communication path information indicting a module on the reception side.

In the description of the fourth embodiment provided below, the following priority order (processing ratio) is set for the communication path group (referred to as a first communication path group hereinafter) which performs transmission from the first module (1) 1301 to the second module 1303 and for the communication path group (referred to as a second communication path group hereinafter) which performs transmission from the first module (2) 1302 to the second module 1303. That is, when there is a plurality of communication data arrived simultaneously at the first and second communication path groups, the second communication path group receives three communication data in a period, whereas the first communication path group receives two communication data in the same period.

Figure 15:
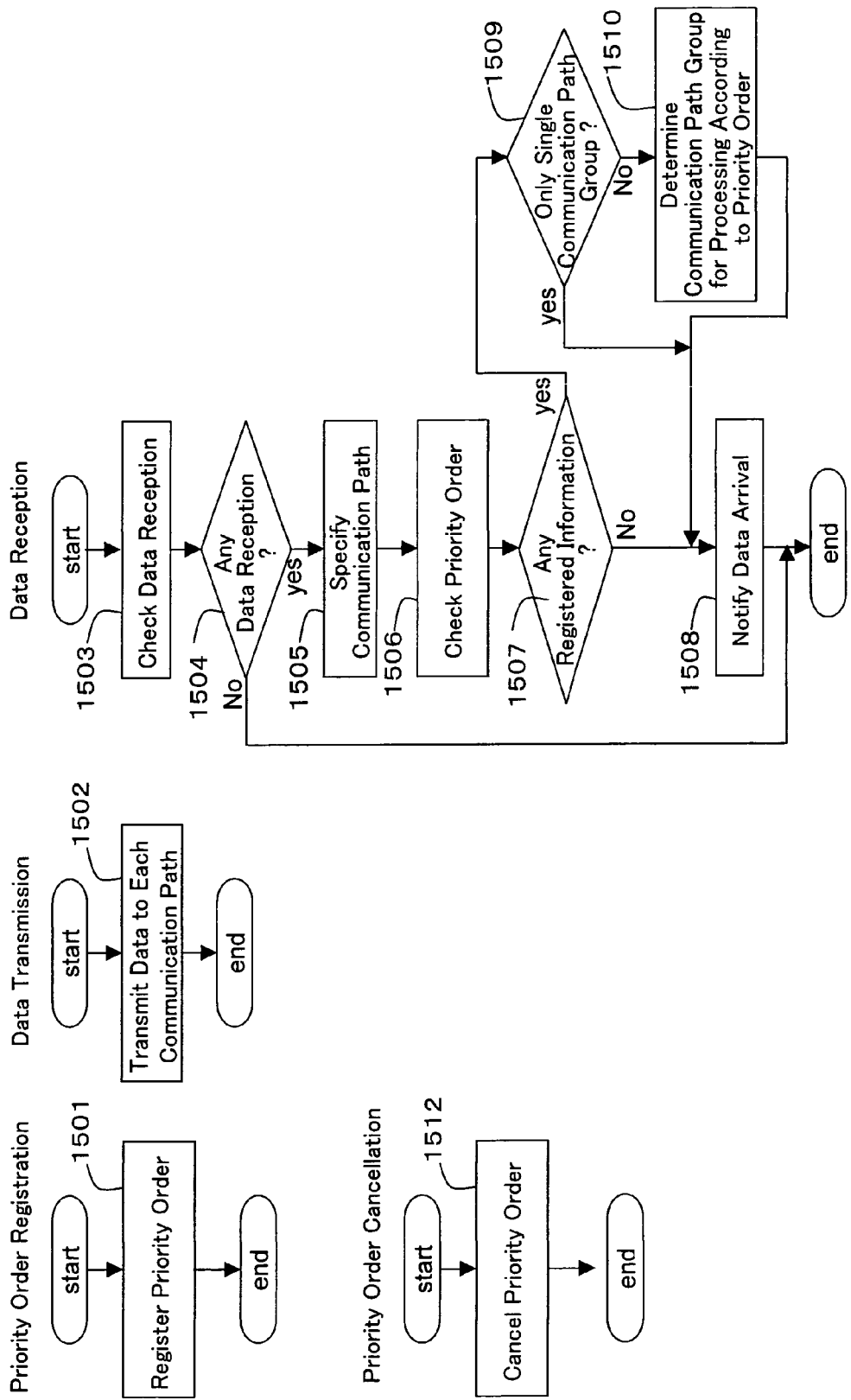
FIG. 15 is a flowchart for showing the control of the inter-module communication apparatus according to the fourth embodiment.

FIG. 15 is a flowchart for showing an example of the operational flow in the case where there is the priority order set in the communication paths.

By referring to block diagrams of FIGS. 13, 14 and a flowchart of FIG. 15, described is a data transmission/reception operation performed between the communication paths having the priority order according to the fourth embodiment.

Transmission Preparatory Operation

When the above-described priority order becomes necessary for the first communication path group and the second communication path group, the priority order information is registered to the priority order relating device 1311 (a step 1501). At this time, in addition to the information of the first and second communication path groups, the priority order information (processing priority ratio) 1402 which is set for the first and second communication path groups is registered to the priority order relating device 1311.

Transmission Operation

When the communication data is transmitted from the first module (1) 1301 to the second module 1303 and from the first module (2) 1302 to the second module 1303, the communication data is transmitted from the first and second transmission units 1304, 1305 to the reception unit 1306 through the communication paths 1307-1310 which are connected to the first and second transmission units 1304, 1305 (a step 1502).

Reception Operation

The reception unit 1306 monitors whether or not the communication data has arrived in all the communication paths (communication paths 1307-1310) (steps 1503, 1504). Upon confirming the arrival of the communication data by the processing of the step 1503 and the step 1504, the reception unit 1306 specifies the communication path to which the communication data has arrived (a step 1505).

When the communication path is specified, the priority order information checking device 1315 checks whether or not the specified communication path is registered to the priority order relating device 1311 (steps 1506, 1507). When it is confirmed by the processing of the steps 1506, 1507 that the specified communication path is not registered to the priority order relating device 1311, the priority order information checking device 1315 notifies the arrival of the communication data to the second module 1303 (a step 1508).

In the meantime, when it is confirmed by the processing of the steps 1506, 1507 that the specified communication path is registered to the priority order relating device 1311, the priority order information checking device 1315 judges whether the specified communication paths (having the communication data reached) are unevenly distributed (concentrated) in either the first communication path group or the second communication path group to which the processing priority order is set, respectively, or dispersedly distributed to both groups (1), (2) (a step 1509).

When it is judged by the processing of the step 1509 that the communication data is unevenly distributed (concentrated) to one of the groups, the reception unit 1306 receives the communication data from the communication path (the specified communication path) to which the communication data has arrived, and the priority order information checking device 1315 notifies the arrival of the communication data to the second module 1303 (a step 1508).

In the meantime, when it is judged by the processing of the step 1509 that the communication data is dispersed, the priority order information analyzer 1314 analyzes the communication path groups by reading out the priority information 1402 which is registered to the priority order relating device 1311, and determines the communication group to be processed based on the analyzed result (a step 1510). After the communication path group is determined, the reception unit 1306 receives the communication data from the determined communication path group, and notifies reception of the communication data to the second module 1303 (a step 1508).

When the priority order information checking device 1315 confirms that the priority orders are not set between the first communication path group and the second communication path group, the reception unit 1306 cancels the priority order stored in the priority order relating device 1311 (a step 1512).

With the above-described configuration, it becomes possible with the fourth embodiment to set the priority order between the communication path groups only when there is priority order set for the communication data transmitted between the communication path groups, and to perform a conventional communication when there is no priority order. Thereby, it is possible with the fourth embodiment to achieve the inter-module communication which is the optimum for the communication state of the modules.

Further, the fourth embodiment employs, as the basic communication structure, the structure according to any one of the first, second, or third embodiment as described above. Therefore, it is possible to set the priority order for communication between the communication paths and, in addition, the communication data can be communicated by securing the priority order.

Furthermore, the fourth embodiment has been described by referring to the case where there is the priority order set in two communication paths. However, the fourth embodiment can be achieved in the communication form where the priority orders are set in three or more communication paths. Further, there may be a plurality of priority orders registered to the priority order relating device 1311. Moreover, although the priority order relating device 1315 and the priority order information analyzer 1314 are formed in the transmission unit 106, they may be provided separately from each other.

Further, in the fourth embodiment, the first modules 1301, 1302 are to operate on the first processor 101, and the second module 1303 is to operate on the second processor 102, respectively. However, the second module 1303 may operate on the first processor 101. In that case, the reception unit 1306 is provided to the first processor 101. Furthermore, the first module (1) 1301 or the first module (2) 1302 may operate on the second processor 102. In that case, the first transmission unit 1304 or the second transmission unit 1305 is provided to the second processor 102 and, in addition, the priority order information register 1311 is provided to the second processor 102.

FIFTH EMBODIMENT

Figure 16:
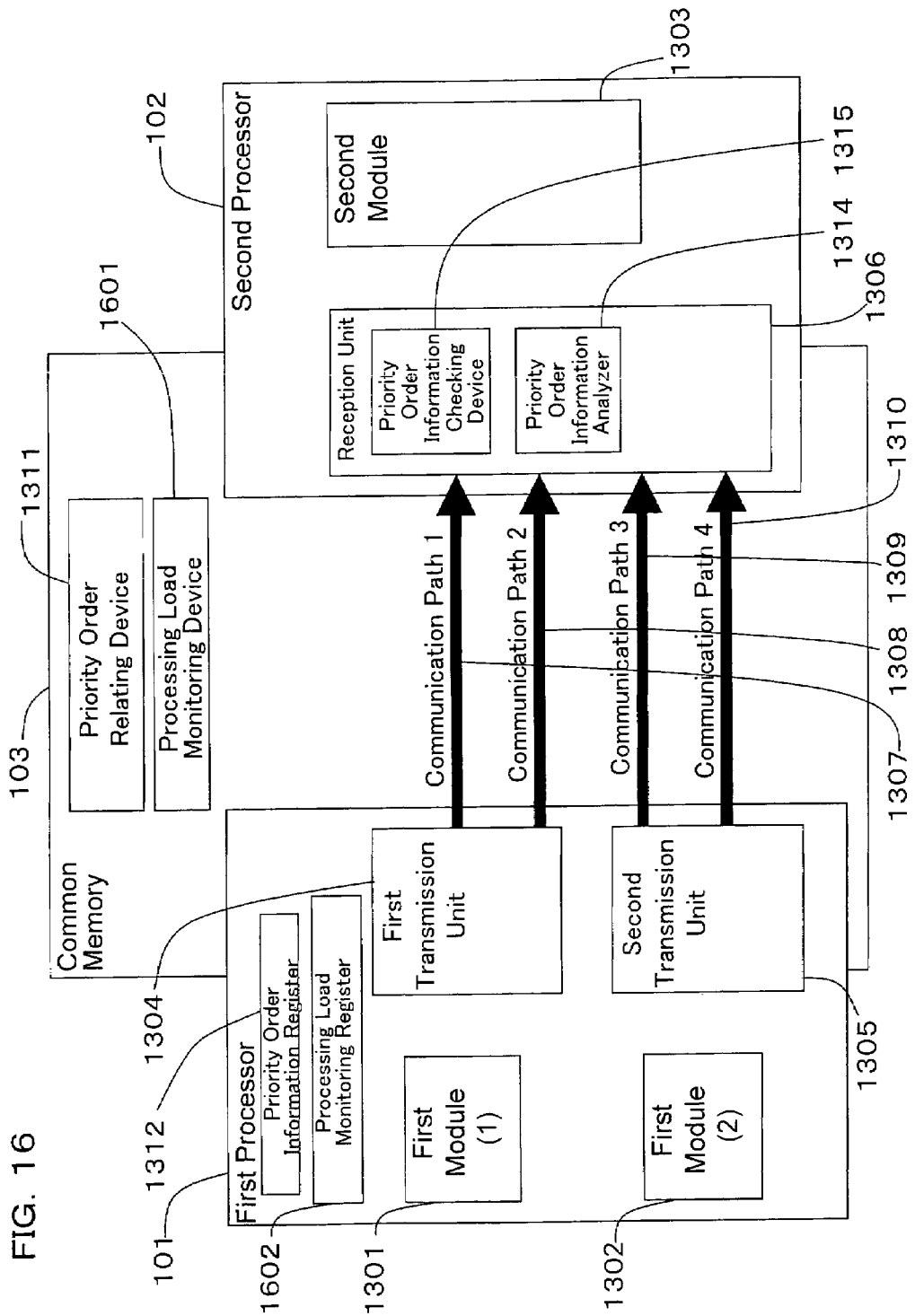
FIG. 16 a block diagram of an inter-module communication apparatus according to a fifth embodiment of the present invention.

FIG. 16 shows the structure of an inter-module communication apparatus according to a fifth embodiment of the present invention. The structure of the fifth embodiment (FIG. 16) is different from that of the fourth embodiment (FIG. 12) in respect that it further comprises a processing load monitor 1601 which monitors the processing amount of the first and second communication path groups registered to the priority order relating device 1311, and a processing load monitoring register 1602 which registers processing load monitoring command to the processing load monitor 1601.

Figure 17:
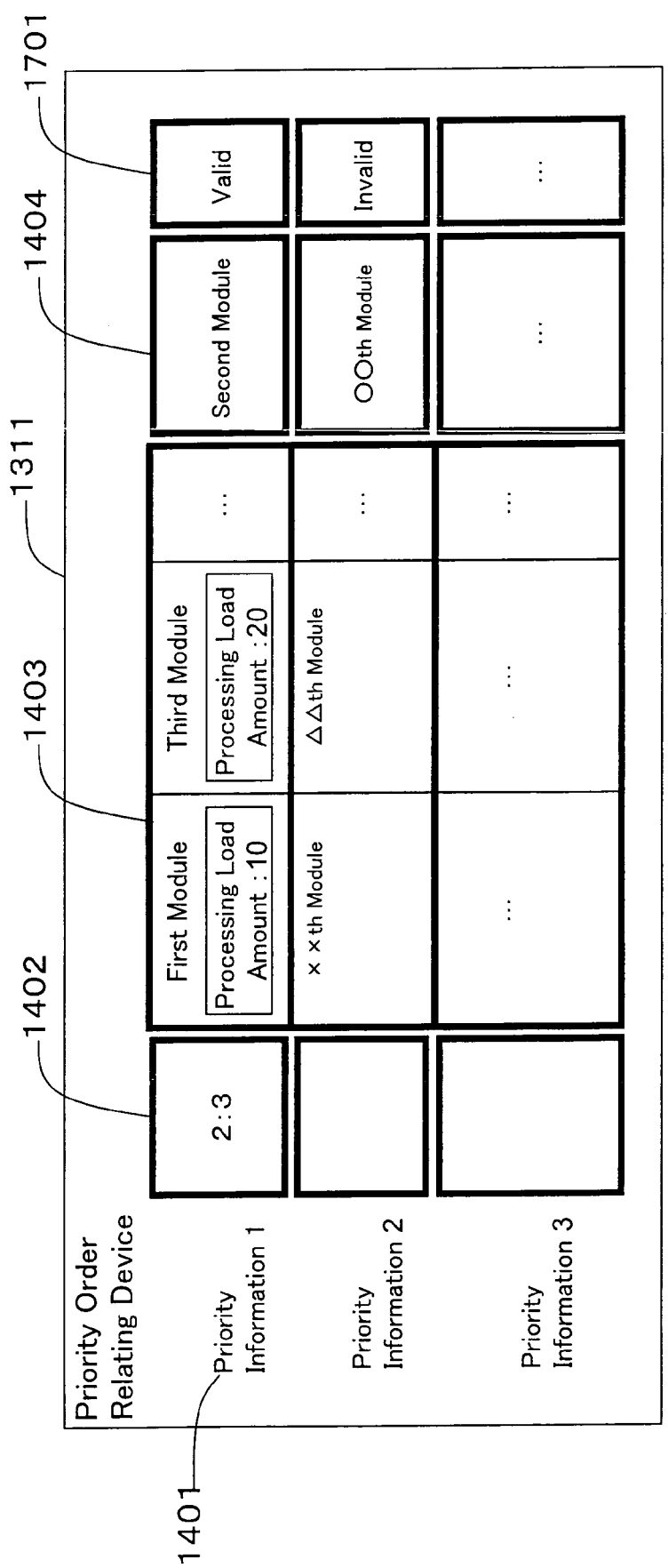
FIG. 17 is a block diagram of a priority order relating device according to the fifth embodiment.

FIG. 17 shows the structure of the priority order relating device 1311 of the fifth embodiment. The structure of the fifth embodiment (FIG. 17) is different from that of the fourth embodiment (FIG. 14) in respect that, as the transmission communication information 1403, there is stored processing load information having the processing load amount of each communication path group. Also, there is provided valid/invalid managing information 1701 which monitors the state (valid/invalid) of the set priority information.

As described above, the fifth embodiment is basically the same as the fourth embodiment except that the processing load monitor 1601 and the processing load monitoring register 1602 are provided. Thus, the description for the same structures will be omitted.

Figure 18:
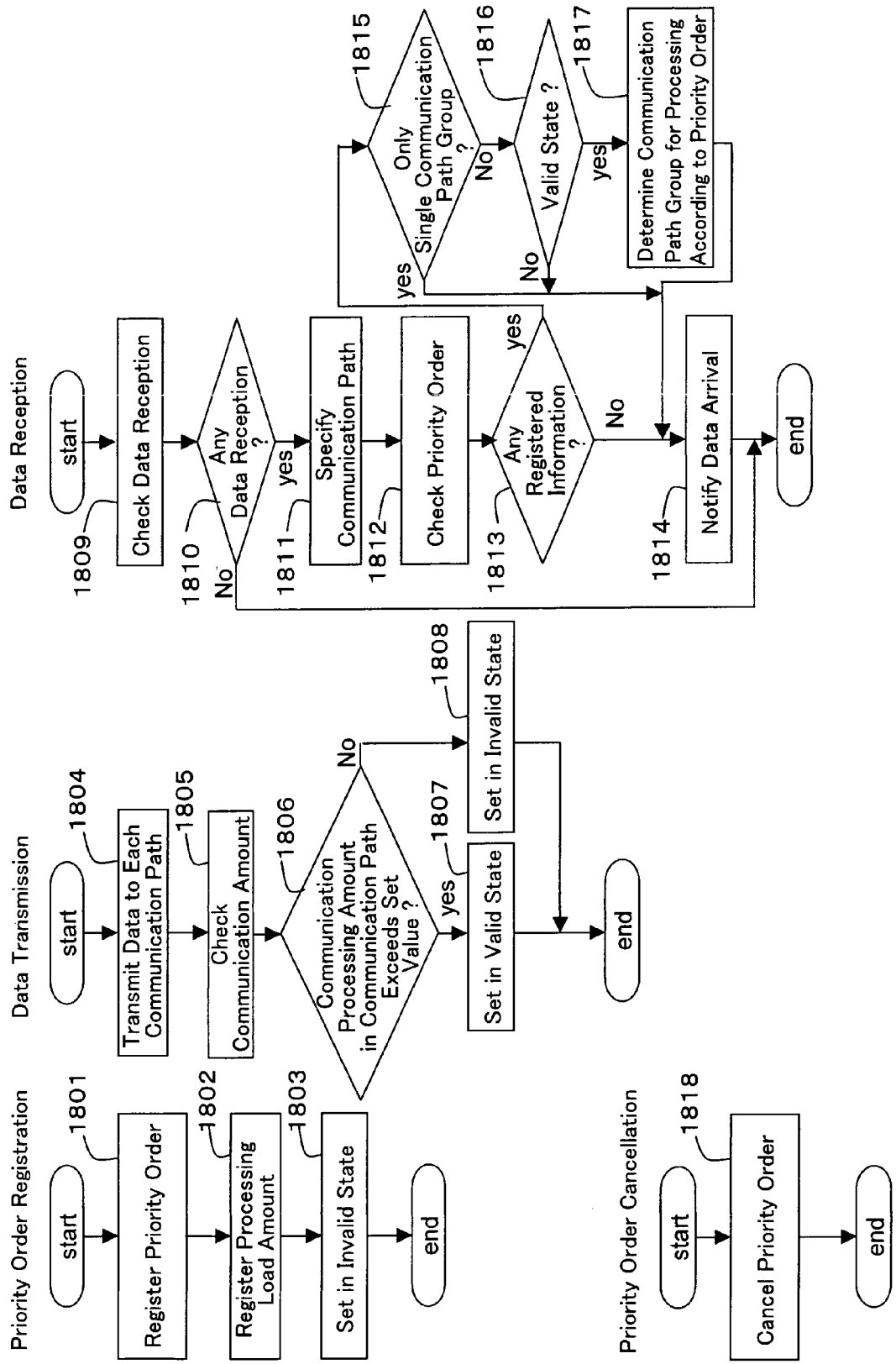
FIG. 18 is a flowchart for showing an example of the operational flow when there is a priority relation generated in accordance with the state of the processing load between the communication paths according to the fifth embodiment.
Figure 19:
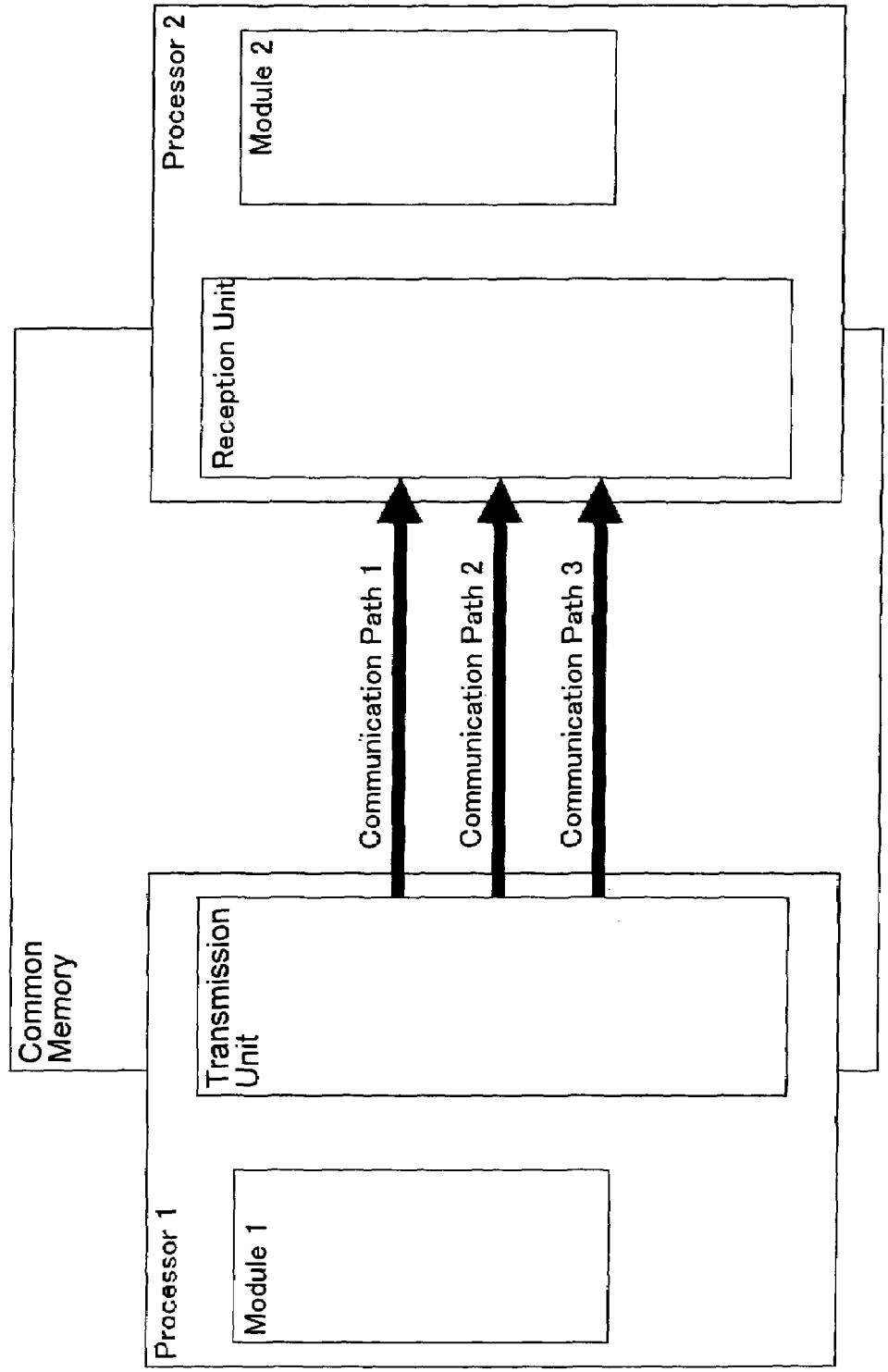
FIG. 19 is a bloc diagram of a conventional inter-module communication.

FIG. 18 is a flowchart for showing an example of the operational flow when there is the priority relations generated due to the processing load state of the communication paths.

By referring to the block diagrams of FIG. 16, FIG. 17, and the flowchart of FIG. 18, described is the operation of the data transmission/reception using the communication paths having the priority order according to the fifth embodiment.

Transmission Preparatory Operation

When the above-described priority order becomes necessary for the first communication path group which transmits the communication data from the first module (1) 1301 to the second module 1303 and for the second communication path group which transmits the communication data from the first module (2) 1302 to the second module 1303, the priority orders are registered to the processing priority order relating device 1311 (a step 1802). Further, the processing load amount is registered as the transmission communication path information (a step 1802). Furthermore, an invalid state is set as the valid/invalid managing information 1701 (a step 1803).

The processing load amount is a parameter which is set as a threshold value for changing the priorities of the first and second communication path groups. When the communication amount in each of the first and second communication path groups reaches the processing load amount or more, processing is carried out for increasing the priority of that communication path group.

Transmission Operation

In the fifth embodiment, the communication data is transmitted to the reception unit 1306 (a step 1804), through the first transmission unit 1304 and one of the communication paths 1307-1310, respectively:

when the data is transmitted from the first module (1) 1301 to the second module 1303 when the data is transmitted from the first module (2) 1302 to the second module 1303

While the data is transmitted, the processing load monitor 1601 monitors the communication amount (steps 1805, 1806). When it is confirmed by the processing of the steps 1805, 1806 that the communication amount in a given communication path exceeds (overflow) the processing load amount registered to the transmission communication path registered information 1403, the processing load monitor 1601 validates the valid/invalid managing information 1701 for the communication path group to which the overflowed communication path belongs (a step 1807).

In the meantime, when it is confirmed by the processing of the steps 1805, 1806 that the communication amount is below the processing load amount registered to the transmission communication path registered information 1403, the processing load monitor 1601 invalidates the state of the valid/invalid managing information 1701 for the communication path group (a step 1808).

Reception Operation

The reception unit 1306 monitors whether or not the communication data has arrived in each of the communication paths (communication paths 1307-1310) (steps 1809, 1810). Upon confirming the arrival of the communication data by the processing of the step 1809 and the step 1810, the reception unit 1306 specifies the communication path to which the communication data has arrived (a step 1811).

When the communication path is specified, the priority order information checking device 1315 checks whether or not the specified communication path is registered to the priority order relating device 1311 (steps 1812, 1813). When it is confirmed by the processing of the steps 1812, 1813 that the specified communication path is not registered to the priority order relating device 1311, the priority order information checking device 1315 notifies the arrival of the communication data to the second module 1303 (a step 1814).

In the meantime, when it is confirmed by the processing of the steps 1812, 1813 that the specified communication path is registered to the priority order relating device 1311, the priority order information checking device 1315 judges whether the specified communication paths (having the communication data reached) are unevenly distributed (concentrated) in either the first communication path group or the second communication path group to which the processing priority order is set, respectively, or dispersedly distributed to both groups (1), (2) (a step 1815).

When it is judged by the processing of the step 1815 that the communication data is unevenly distributed (concentrated) to one of the groups, the reception unit 1306 receives the communication data from the communication path (the specified communication path) to which the communication data has arrived, and the priority order information checking device 1315 notifies the arrival of the communication data to the second module 1303 (a step 1814).

In the meantime, when it is judged by the processing of the step 1815 that the communication data is dispersed, the priority order information analyzer 1314 checks the validity/invalidity of the priority order information by reading out the valid/invalid information 1701 which is registered to the priority order relating device 1311 (a step 1816).

When it is confirmed by the processing of the step 1816 that the priority order information is in the invalid state, the priority order information analyzer 1314 notifies the arrival of the communication data to the second module 1303 (a step 1814).

When it is confirmed by the processing of the step 1816 that it is in the valid state, the priority order information analyzer 1314 analyzes the communication path group to be processed according to the transmission communication path information registered to the priority order relating device 1311, and determines the communication path group to be processed (a step 1817). After the communication path group to be processed is determined, the reception unit 1306 receives the communication data from the determined communication path group and notifies the reception of the data to the second module 1303 (a step 1814).

When it becomes unnecessary to set the processing priority relation between the first communication path group and the second communication path group, the priority order registered to the processing order relating device 1311 is cancelled (a step 1818).

With the structure as described above, in addition to the structure of the fourth embodiment, it is possible with the fifth embodiment to determine the priorities between the communication path groups in accordance with the processing amount by enabling to monitor the amount of the processing communication data in the communication paths.

Further, the fifth embodiment employs, as the basic communication structure, the structure according to any one of the first, second, or third embodiment as described above. Therefore, it is possible to set the priorities for the communication between the communication path groups and, in addition, the communication data can be transmitted by securing the processing order.

Furthermore, the fifth embodiment has been described by referring to the case where there is the priority order set in the two communication path groups. However, the fifth embodiment can be achieved in the communication form where the priority orders are set in three or more communication path groups. Further, there may be a plurality of sets of priority order information registered to the priority order relating device 1311. Moreover, although the priority order relating device 1315 and the priority order information analyzer 1314 are provided in the transmission unit 106, they may be provided separately from each other.

Furthermore, in the description of the fifth embodiment presented above, one processing amount for each communication group is set to be registered to the transmission communication path information 1403 of the priority order relating device 1311. However, there may be a plurality of processing load amounts registered for each communication path group. In that case, a plurality of sets of processing ratio information 1402 are set by corresponding to a plurality of processing load amounts.

Further, unlike the above-described fifth embodiment, the second module 1303 may operate on the first processor 101. In that case, the reception unit 1306 is provided to the first processor 101. Furthermore, the first modules (1) 1301 and (2) 1302 may operate on the second processor 102. In that case, the first transmission unit 1304 or the second transmission unit 1305 is provided to the second processor 102, and the priority order information register 1311 is also provided to the second processor 102.

The inter-module communication apparatus according to the present invention comprises a function of giving the processing order (priority order) only to the required communication path among a plurality of the communication paths and to the required processing. This function enables to perform, for example, a special reproduction while keeping the response performance for the reproduction/stop command to the conventional level when performing a standard reproduction of video/audio data on a video/audio recording/reproducing device. As described, the present invention is effectively applied to the video/audio recording/reproducing device.

The present invention has been described in detail by referring to the most preferred embodiments. However, it is not intended to be limited to the preferred embodiments but various combinations and modifications of the components are possible without departing from the sprit and the broad scope of the appended claims.

What is claimed is:

1. An inter-module communication apparatus, comprising:
   a first module and a second module which operate individually on a processor;
   a common memory interposed between said first module and said second module for functioning as a communication medium;
   a plurality of communication paths provided to said common memory for connecting said first module and said second module to be communicable;
   a transmission unit for transmitting communication data from said first module to said second module, each of the communication data transmitted by two or more of said plurality of communication paths being independent;
   a reception unit for receiving said communication data transmitted from said first module by said second module;
   a processing order relevance register in the transmission unit which, for transmission, registers processing order information upon determining that a processing order processed in the reception unit is needed among said independent communication data being transmitted by two or more of said plurality of communication paths;
   a processing order relating device for setting said processing order information such that said reception unit receives said independent communication data in the order indicated by the processing order information;
   a reception processing relevance checking device which, for reception, checks with said processing order relating device whether or not there is said processing order information set between said communication path which transmitted said received communication data and one or more others of said plurality of communication paths; and
   a processing order information analyzer which, for reception, analyzes whether or not said received communication data is in compliance with said processing order information, when said reception processing relevance checking device confirms that there is said processing order set between said communication path which transmitted said received communication data and said one or more others of said plurality of communication paths, wherein
   said communication data which is judged by said processing order information analyzer as being compliant with said processing order information is reception-processed according to said processing order information.

2. The inter-module communication apparatus as claimed in claim 1, further comprising:
- a processing order information managing device which reads out and stores, as a transmission processing order, said processing order information set to said processing order relating device, and also updates contents of said stored transmission processing order every time said communication data is transmitted;
- a transmission processing relevance checking device which, for transmission, checks with said processing order relating device for each of said communication data to be transmitted whether or not said communication path used for transmission has said processing order information set between said one or more others of said plurality of communication paths;
- a processing order information adder which obtains said transmission processing order from said processing order information managing device and adds said obtained transmission processing order to said communication data to be transmitted, when said transmission processing relevance checking device confirms that said communication path used for transmission has said processing order information set between said one or more others of said plurality of communication paths; and
- a reception order information managing device which reads out and stores, as a reception processing order, said processing order information set to said processing order relating device, and also updates contents of said reception stored processing order every time said communication data is received, wherein said processing order information analyzer analyzes whether or not said received communication data is in compliance with said processing order information by comparing said transmission processing order added to said received communication data with said reception processing order stored in said reception order information managing device, when said reception processing relevance checking device confirms that there is said processing order information set between said communication path which transmitted said received communication data and said one or more others of said plurality of communication paths.

3. The inter-module communication apparatus as claimed in claim 2, wherein
said transmission unit comprises said processing order relevance register, said transmission processing relevance checking device, said processing order information managing device, and said processing order information adder, and
said reception unit comprises said reception processing relevance checking device and said processing order information analyzer.

4. The inter-module communication apparatus as claimed in claim 1, further comprising:
- a data position detector which, for transmission, detects positional information of said communication data to be transmitted;
- a processing order managing device for registering said positional information of said communication data; and
- a data position register which registers respective positional information of said communication data, which is detected by said data position detector, to said processing order managing device in accordance with time sequence, wherein
said processing order information analyzer analyzes whether or not said received communication data is in compliance with said processing order by collating position of said received communication data with registered content of said data position register, when said reception processing relevance checking device confirms that there is said processing order information set between said communication path which transmitted said received communication data and said one or more others of said plurality of communication paths.

5. The inter-module communication apparatus as claimed in claim 4, wherein said data position detector detects address of said communication data.

6. The inter-module communication apparatus as claimed in claim 1, further comprising:
- a communication path switching information transmitter which, for transmission, adds communication path switching information indicating a change of a next transmission communication path to currently transmitted said communication data, when confirmed by collating said processing order with said processing order relating device that said communication path for transmitting said communication data to be processed next is switched from said communication path which is currently in use;
- a valid communication path information managing device which, for reception, stores valid communication path information designating said communication path as a processing target;
- a valid communication path information changing device which, for reception, updates said valid communication path information stored in said valid communication path managing device based on said communication switching information which is added to said received communication data; and
- a processing communication path determining device which, for reception, determines said communication path as a processing target based on said valid communication path information stored in said valid communication path information managing device.

7. The inter-module communication apparatus as claimed in claim 6, wherein said processing order relevance register further registers, to said processing order relating device, said communication path which performs communication first in said processing order information.

8. The inter-module communication apparatus as claimed in claim 6, further comprising a processing order starting information transmitter for transmitting processing order starting information which indicates a point where said processing order information set to said processing order relevance register becomes valid.

9. The inter-module communication apparatus as claimed in claim 6, further comprising a processing order ending information transmitter for transmitting processing order ending information which indicates a point where said processing order information set to said processing order relevance register becomes invalid.

10. The inter-module communication apparatus as claimed in claim 1, wherein:
- a plurality of said first modules are provided;
- said transmission unit comprises a first transmitter for transmitting said communication data from one of said first modules to said second module, and a second transmitter for transmitting said communication data from another of said first modules to said second module;
- said processing order relating device is for recording priority order of communication processing, which are set between said communication path connecting said first transmission unit and said reception unit and said communication path connecting said second transmission unit and said reception unit;

said processing order relevance register registers said priority order to said processing order relating device;

said reception processing relevance checking device checks with said processing order relating device whether or not said priority order is set; and said processing order information analyzer analyzes said communication path to be processed based on said priority order which is checked by said processing order information checking device.

11. The inter-module communication apparatus as claimed in claim 10, wherein said processing order relevance register registers, to said processing order relating device, processing ratio which is allotted to processing of said communication data transmitted through said communication path connecting said first transmission unit and said reception unit and allotted to processing of said communication data transmitted through said communication path connecting said second transmission unit and said reception unit, as said priority order.

12. The inter-module communication apparatus as claimed in claim 10, wherein:

said processing order relating device further registers valid/invalid managing information which indicates validity/invalidity of registered priority information, and processing load amount information which is a threshold value for changing said valid/invalid managing information; and said inter-module communication apparatus further comprises a processing load monitor which sets said processing load amount information according to respective communication amount of said communication path and registers said processing load amount information to said processing order relating device, and a processing load monitoring register which sets said valid/invalid managing information based on a result of comparison between said respective communication amount of said communication path and said processing load amount information.

* * * * *